(12) United States Patent
Nishihara et al.

(10) Patent No.: US 7,106,274 B2
(45) Date of Patent: Sep. 12, 2006

(54) STEREOSCOPIC IMAGE DISPLAY APPARATUS AND STEREOSCOPIC IMAGE DISPLAY SYSTEM

(75) Inventors: Hiroshi Nishihara, Tokyo (JP); Naosato Taniguchi, Tokyo (JP); Toshiyuki Sudo, Tokyo (JP); Hideki Morishima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 361 days.

(21) Appl. No.: 10/439,215

(22) Filed: May 14, 2003

(65) Prior Publication Data

US 2003/0214459 A1 Nov. 20, 2003

(30) Foreign Application Priority Data

May 17, 2002 (JP) ............................. 2002-143912

(51) Int. Cl.
G09G 5/00 (2006.01)

(52) U.S. Cl. ................ 345/6; 345/9; 345/204

(58) Field of Classification Search .................... 345/6, 345/419–436, 440, 9, 55, 473, 204; 348/39, 348/36, 42, 51, 49; 349/15; 359/619, 463, 359/462, 465, 464, 457
See application file for complete search history.

(56) References Cited

U.S. PATENT DOCUMENTS

| | | | |
|---|---|---|---|
| 5,485,308 A * | 1/1996 | Hirata et al. ................. 359/457 |
| 5,694,530 A * | 12/1997 | Goto ........................... 345/419 |
| 5,808,599 A * | 9/1998 | Allio ............................. 345/6 |
| 5,936,596 A * | 8/1999 | Yoshida et al. ................. 345/9 |
| 5,945,965 A * | 8/1999 | Inoguchi et al. ................ 345/6 |
| 5,946,027 A * | 8/1999 | Allio ........................... 348/49 |
| 5,956,001 A * | 9/1999 | Sumida et al. ................. 345/55 |
| 5,991,074 A * | 11/1999 | Nose et al. ................... 359/465 |
| 6,023,277 A * | 2/2000 | Osaka et al. ................. 345/419 |
| 6,160,527 A * | 12/2000 | Morishima et al. ............. 345/7 |
| 6,169,552 B1 * | 1/2001 | Endo et al. .................. 345/427 |
| 6,191,808 B1 * | 2/2001 | Katayama et al. ............ 348/39 |
| 6,445,406 B1 * | 9/2002 | Taniguchi et al. ............ 348/51 |
| 6,462,871 B1 * | 10/2002 | Morishima ................... 359/463 |
| 6,549,207 B1 * | 4/2003 | Matsumoto .................. 345/473 |
| 6,561,906 B1 * | 5/2003 | Suzuki ......................... 463/31 |
| 6,677,939 B1 * | 1/2004 | Uchiyama ................... 345/419 |
| 6,825,985 B1 * | 11/2004 | Brown et al. ................. 359/619 |
| 6,859,240 B1 * | 2/2005 | Brown et al. ................. 349/15 |
| 7,064,895 B1 * | 6/2006 | Morishima et al. ......... 359/463 |
| 2002/0021492 A1 * | 2/2002 | Morishima et al. ......... 359/463 |
| 2002/0113866 A1 * | 8/2002 | Taniguchi et al. ............ 348/51 |
| 2003/0122828 A1 * | 7/2003 | Lukyanitsa ................. 345/440 |
| 2003/0206343 A1 * | 11/2003 | Morishima et al. ......... 359/463 |
| 2003/0214497 A1 * | 11/2003 | Morishima et al. ......... 345/204 |
| 2004/0165263 A1 * | 8/2004 | Sudo et al. ................. 359/462 |
| 2006/0012593 A1 * | 1/2006 | Iriguchi et al. ............. 345/204 |

FOREIGN PATENT DOCUMENTS

JP 10-253926 9/1998

* cited by examiner

*Primary Examiner*—Bipin Shalwala
*Assistant Examiner*—Prabodh Dharia
(74) *Attorney, Agent, or Firm*—Morgan&Finnegan L.L.P.

(57) ABSTRACT

A stereoscopic image display apparatus comprising an image display unit that displays combined images formed by combining three different pixels groups in a horizontal direction, which correspond to three different viewpoint images, respectively; a mask member with a plurality of aperture portions that guides light from each pixel group to a corresponding viewpoint; a lenticular lens array arranged between the image display unit and the mask member; and a switching control circuit that switches arrangement of the aperture portions in the mask member in synchronization with switching of the combined images.

2 Claims, 37 Drawing Sheets

FIG.19
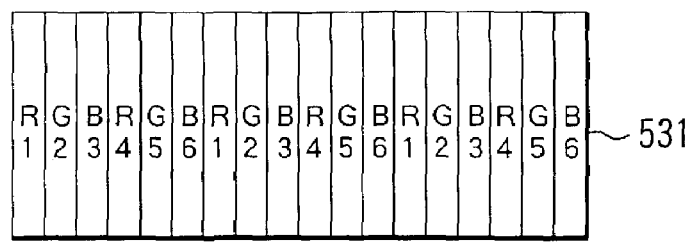
531
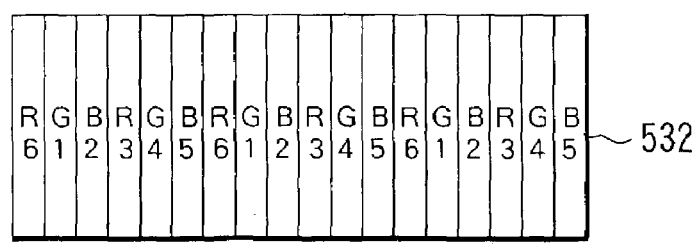
532
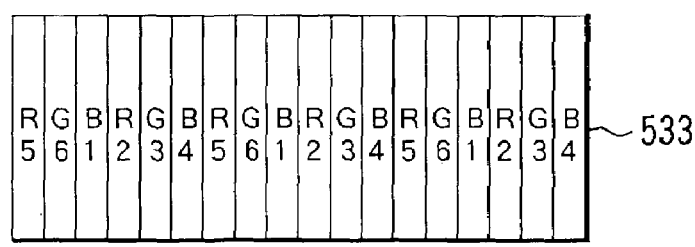
533
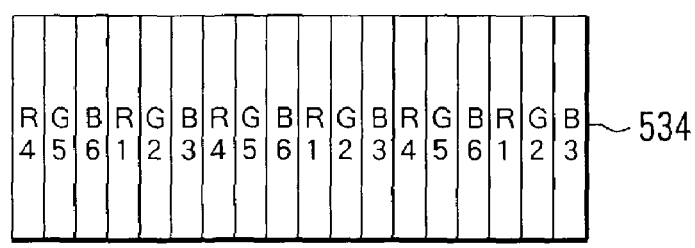
534
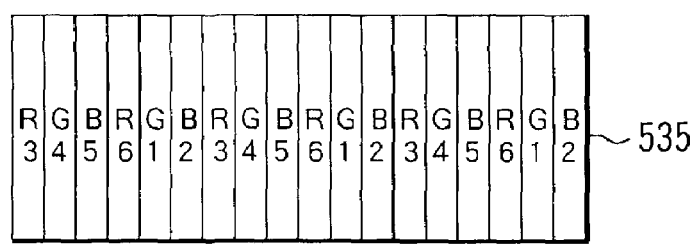
535
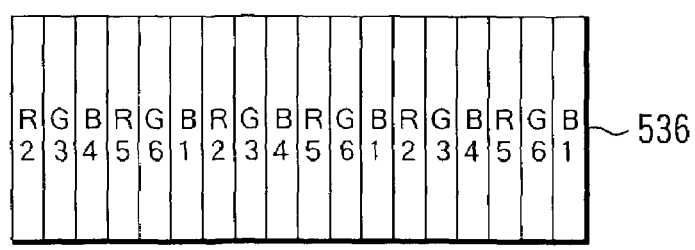
536

STEREOSCOPIC IMAGE DISPLAY APPARATUS AND STEREOSCOPIC IMAGE DISPLAY SYSTEM

BACKGROUND OF THE INVENTION

1. Field of the Invention

The present invention relates to a stereoscopic image display apparatus, and in particular, to a stereoscopic image display apparatus suitable for performing stereoscopic display in a TV set, a VCR, a computer monitor, a game machine, and the like.

2. Description of Related Art

There is a parallax panoramagram as a stereoscopic image display apparatus that expresses conventional motion parallax.

This apparatus has a mask member, in which a plurality of vertical slit-like apertures is arranged horizontally, on a display surface side of a combined parallax image that is combined after a plurality of images corresponding to multiple viewpoints (observation positions) is divided into strip pieces, and shows the plurality of images corresponding to the multiple viewpoints with dividing them into a plurality of viewpoints. Owing to this, it becomes possible to display a natural stereoscopic image that has continuous motion parallax according to the movement of a viewpoint.

Nevertheless, in this type of stereoscopic image display apparatus, since display resolution depends on the resolution of a display unit, the resolution of each individual parallax image is lowered when the multiviewpoint image is displayed. Hence, image quality is deteriorated.

For such a subject, a stereoscopic image display apparatus shown in Japanese Patent Laid-Open No. 1998-253926 is proposed.

According to this proposal, the degradation of image quality is reduced by horizontally changing a position of an area, where apertures are formed, in a mask member having the vertical slit apertures, and horizontally forming an observation area of a multiviewpoint image by switching display images with synchronizing with the change of the apertures.

Nevertheless, the following troubles are concerned in the conventional stereoscopic image display apparatus.

1. Since the mask member having the vertical slit apertures is used, the resolution of an image corresponding to one viewpoint given to an observer is lowered only in the horizontal resolution as shown in FIG. 37.

FIG. 37 shows the case of using six images. Namely, though pixels constituting an image corresponding to one viewpoint become dense in the vertical direction, they become sparse in the horizontal direction. Hence, since a bias arises in the arrangement of the pixels constituting the image, it becomes an unbalanced image.

Even if it is aimed to display a high-resolution stereoscopic image by generating afterimages by displaying such unbalanced images with switching them at high speed, it is difficult to recognize them as one smooth stereoscopic image.

2. When a display unit having vertically-striped color filter structure in which R, G, and B filters line up in the vertical direction is used as a display unit, image quality is deteriorated since each color of R, G, and B is separately observed in a viewpoint.

3. Since the number of pixels displaying images (viewpoints) is decreased when the number of displaying pixels is increased, the resolution is lowered.

SUMMARY OF THE INVENTION

The present invention aims to provide a so-called multieye type stereoscopic image display apparatus that has low degradations of image quality and can perform high-resolution display.

In order to achieve the above-described object, the stereoscopic image display apparatus according to the present invention presents viewpoint images to a plurality of viewpoints. The apparatus includes an image display unit displaying a combined image formed by combined the plurality of viewpoint images, by using pixel groups different every viewpoint image and substantially a mask member having a plurality of aperture portions to pass only rays of light, directing to a viewpoint corresponding to a viewpoint image that each pixel group displays, among rays of light from the pixel group. Moreover, this also includes a switching control circuit that makes the image display unit display a plurality of combined images, in which viewpoints corresponding to combined viewpoint images that are combined are mutually different, with switching the plurality of combined images, and that switches arrangement of a plurality of aperture portions in the mask member with synchronizing with the switching of these combined images.

Features of the stereoscopic image display apparatus according to the present invention will become clear by the following description of specific embodiments with referring to drawings.

BRIEF DESCRIPTION OF THE DRAWINGS

FIG. 19 is a drawing showing examples of combined parallax images displayed in the stereoscopic image display apparatus according to the Embodiment 2.

DETAILED DESCRIPTION OF THE PREFERRED EMBODIMENTS (Embodiment 1)

Figure 1:
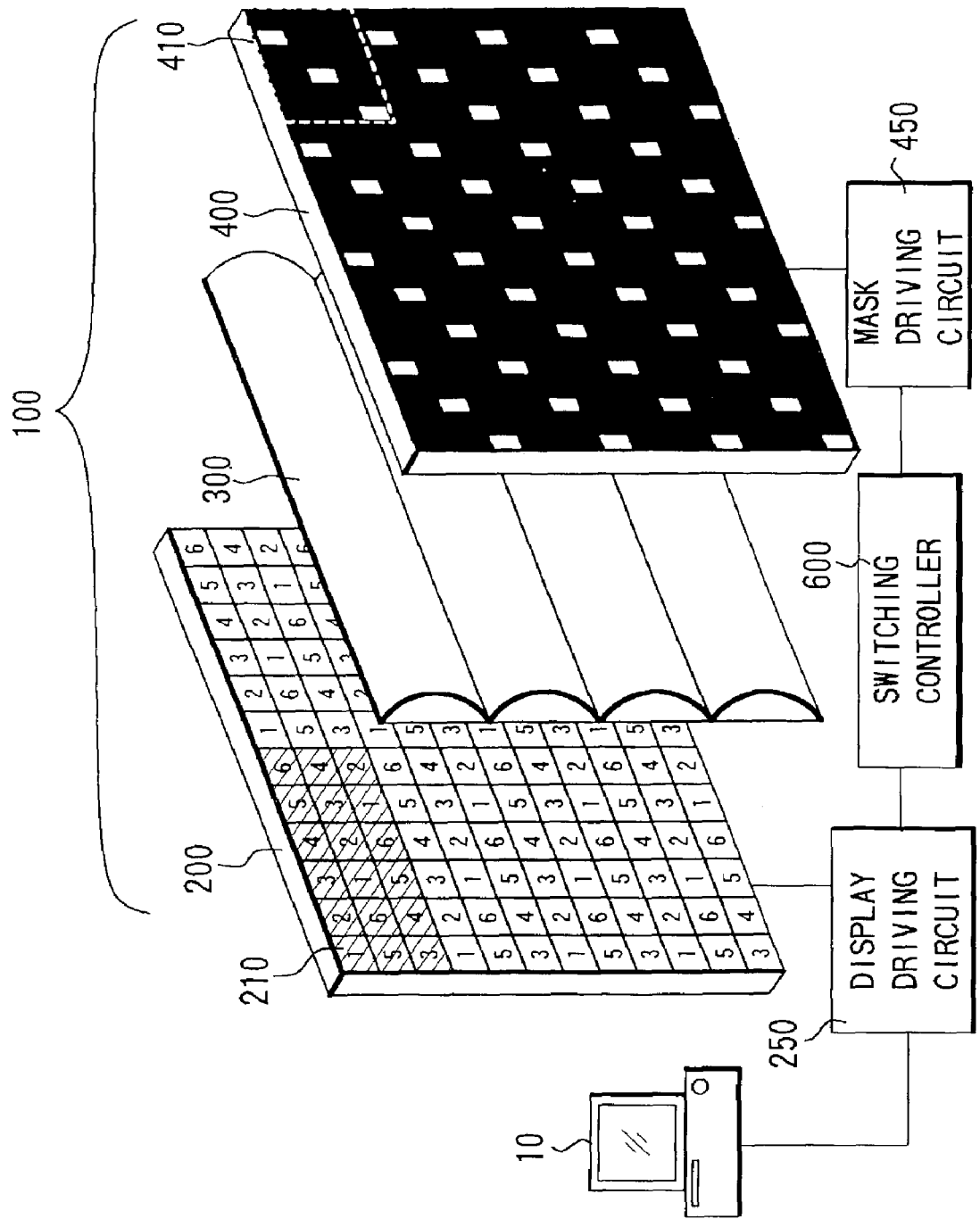
FIG. 1 is a perspective view showing the structure of a multieye type stereoscopic image display apparatus that is Embodiment 1 of the present invention.

FIG. 1 shows the schematic structure of a multieye type stereoscopic image display apparatus 100 that is Embodiment 1 of the present invention.

(Entire Structure of Stereoscopic Image Display Apparatus 100)

The stereoscopic image display apparatus 100 comprises a display unit (image display unit) 200, a lenticular lens (optical member) 300, and a mask 400 as shown in FIG. 1.

(Display Unit 200)

The display unit 200 comprises a display device where pixels are arranged horizontally and vertically in a matrix-like pattern. For example, a liquid crystal display unit, a plasma display unit, an organic electroluminescence display unit, and a projector can be used as the display unit 1. In addition, a display driving circuit 250 that drives this display unit 200 is given image information from an image information supplying apparatus 10 such as a personal computer, a VCR, or a DVD player. Then, the display driving circuit 250 drives respective pixels of the display unit 200 according to the image information to show images.

The display unit 200 displays a combined parallax image into which a plurality of images (hereafter, an individual image is called a viewpoint image) that has parallax corresponding to observation positions (hereafter, each observation position is called a viewpoint) is combined. Here, on the display unit 200, one pixel block in which pixels are arranged in a matrix is formed by arranging pixels in the horizontal direction substantially and the vertical direction. Pixels in the pixel block display the substantially same portion in each viewpoint image. Then, the display unit 200 can display a combined parallax image formed by combining the whole of the plurality of viewpoint images, which is above described, by arranging a plurality of pixel blocks in a matrix.

A hatched area on the display unit 200 in FIG. 1 is one pixel block 210. This embodiment is an example of the arrangement of pixels in the case that the number of viewpoint images is 6, that is, the case that three pairs of parallax images are obtained.

In FIG. 1, numbers of 1 to 6 shown in a pixel block 210 show which viewpoint images are displayed by the pixels respectively.

One pixel block 210 is constituted by arranging six pixels 1 to 6, which display the substantially same portion in first to sixth viewpoint images respectively, in three rows×six columns.

In the state (state before switching operation of combined parallax images and mask patterns that are described later) shown in FIG. 1, pixels 1 to 6 are arranged in this order in the first row (horizontal pixel line) that is a top row. Nevertheless, pixels are arranged in the order of pixels 5, 6, 1, 2, 3, and 4 in the second row that is a second row from the top, and in the order of pixels 3, 4, 5, 6, 1, and 2 in the third row that is a bottom row.

Namely, a pixel pattern is set so that pixels adjacent in the vertical direction may become pixels of mutually different pixel groups (a group of pixels 1 to a group of pixels 6) in a pixel block (moreover, in the entire display unit).

(Lenticular Lens 300)

The lenticular lens 300 is constituted by arranging a plurality of cylindrical lens portions, each having a generating line in the horizontal direction, in the vertical direction. In addition, the lenticular lens 300 does not horizontally exert an optical action to rays of light from pixels.

(Mask 400)

Figure 2:
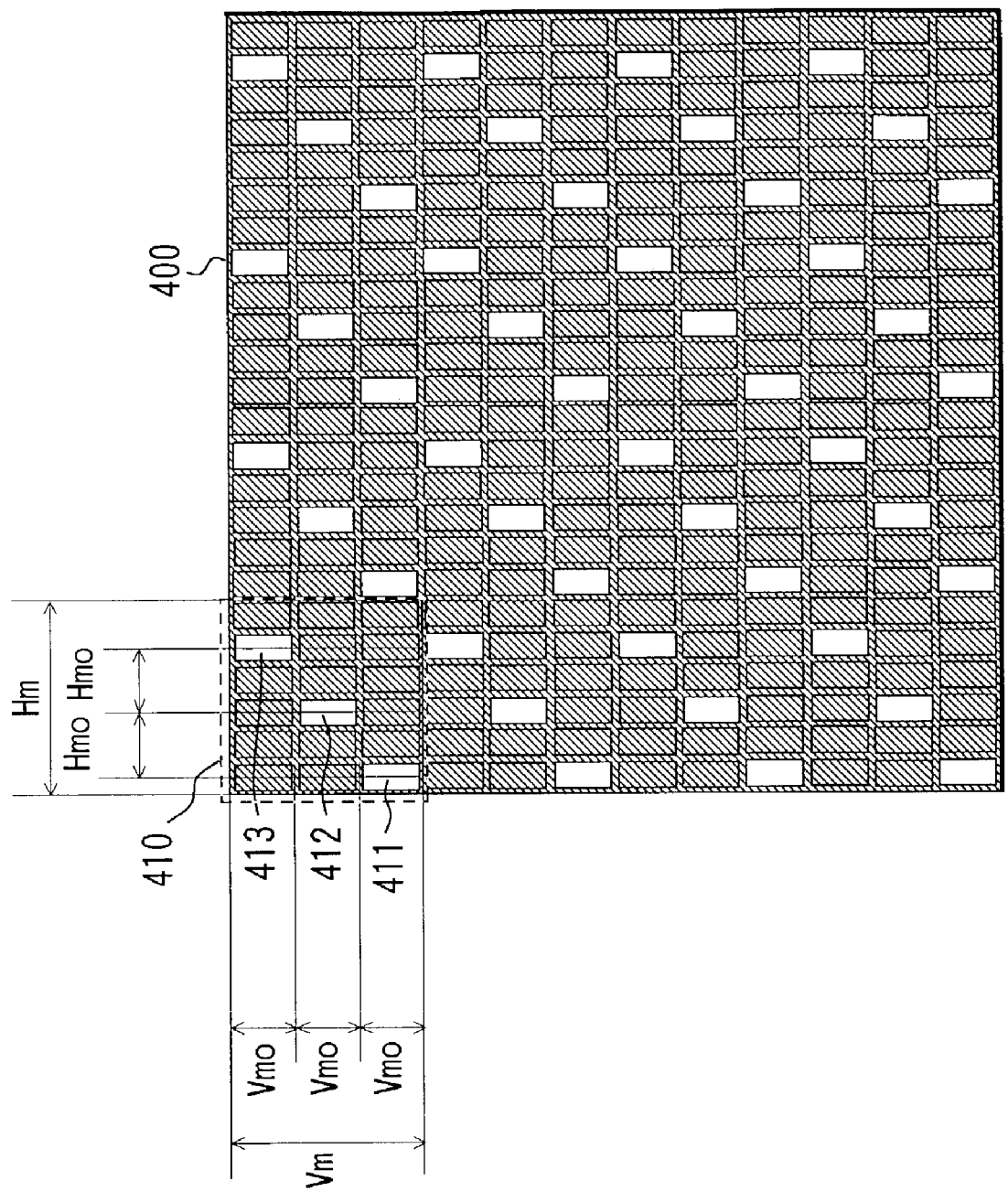
FIG. 2 is a front view showing a mask used for the stereoscopic image display apparatus according to the Embodiment 1.

FIG. 2 shows the specific structure of the mask 400. This mask 400 comprises a liquid crystal panel in which a plurality of rectangular unit areas are arranged in a matrix, and can form a desired aperture pattern as a whole by switching a transmissive state and a shading state in each unit area by electrical control performed by the mask driving circuit 450 shown in FIG. 1.

As shown in this drawing, a mask block 410 is formed on the mask 400, and a plurality of mask blocks 410 is arranged in a matrix in the entire mask 400.

Similarly to the pixel arrangement in the pixel block 201, one mask block 410 has matrix-like unit area arrangement that six unit areas are horizontally arranged and three unit areas are also vertically arranged.

FIG. 2 shows the state that three aperture portions 411, 412, and 413 are formed with making three unit areas transmissive among the unit areas in the mask block 410.

Herein, Vm is the vertical height of the mask block 410, and Hm is its horizontal width. In addition, Vmo is the height of each unit area.

Moreover, the three aperture portions 411, 412, and 413 in the mask block 410 are arranged so that their vertical positions may mutually adjoin and their horizontal positions may mutually differ. Hmo is a horizontal interval of aperture portions.

(Description of Optical Actions of Lenticular Lens 300)

Figure 3:
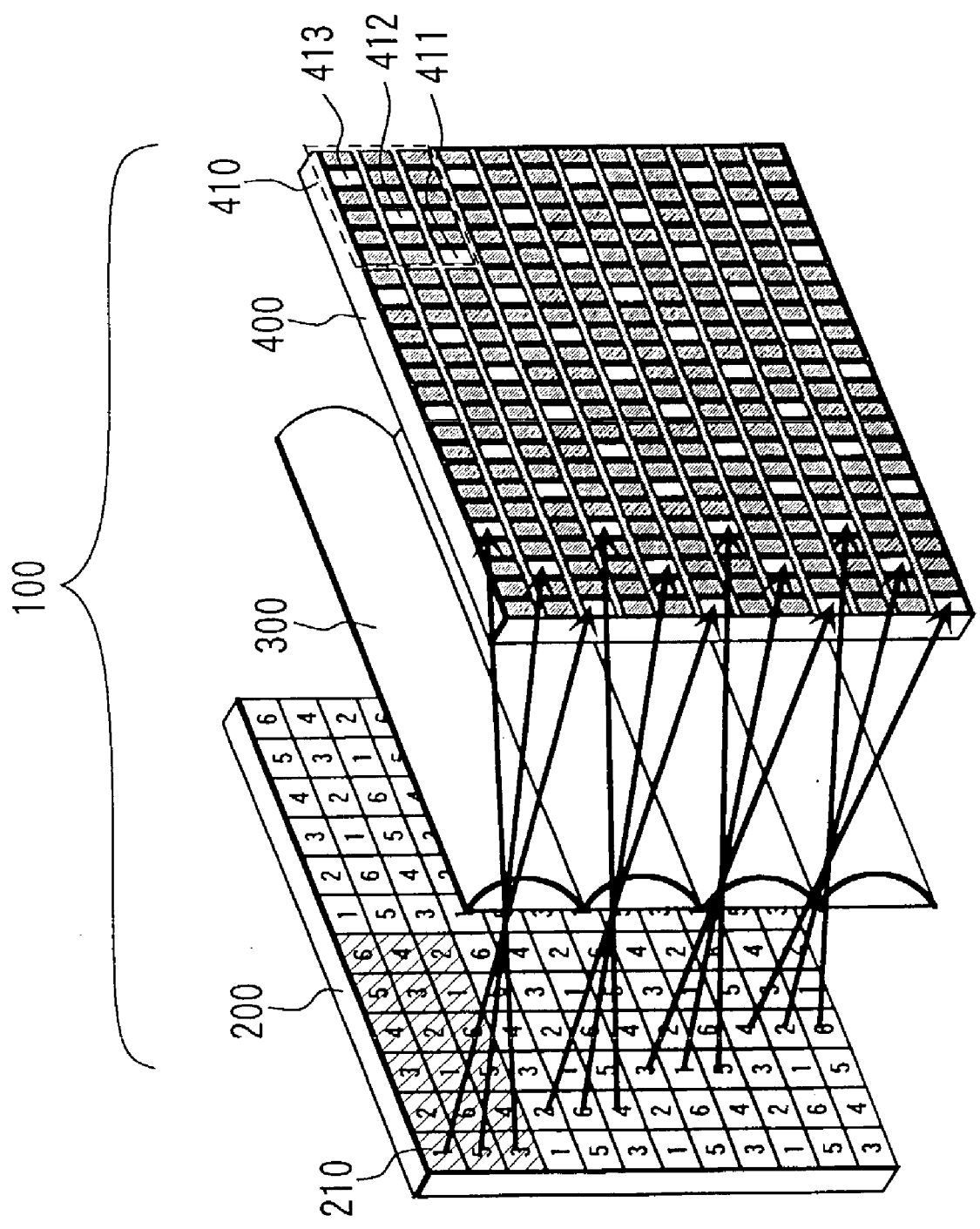
FIG. 3 is a perspective view showing rays of light incident on optical mask apertures from pixels in the stereoscopic image display apparatus according to the Embodiment 1.

As shown in FIG. 3, rays of light radially emerged from pixels on the display unit 200 are given a lens action (condensing action) in the vertical direction by each cylindrical lens portion of the lenticular lens 300 in a specific vertical section.

Figure 4:
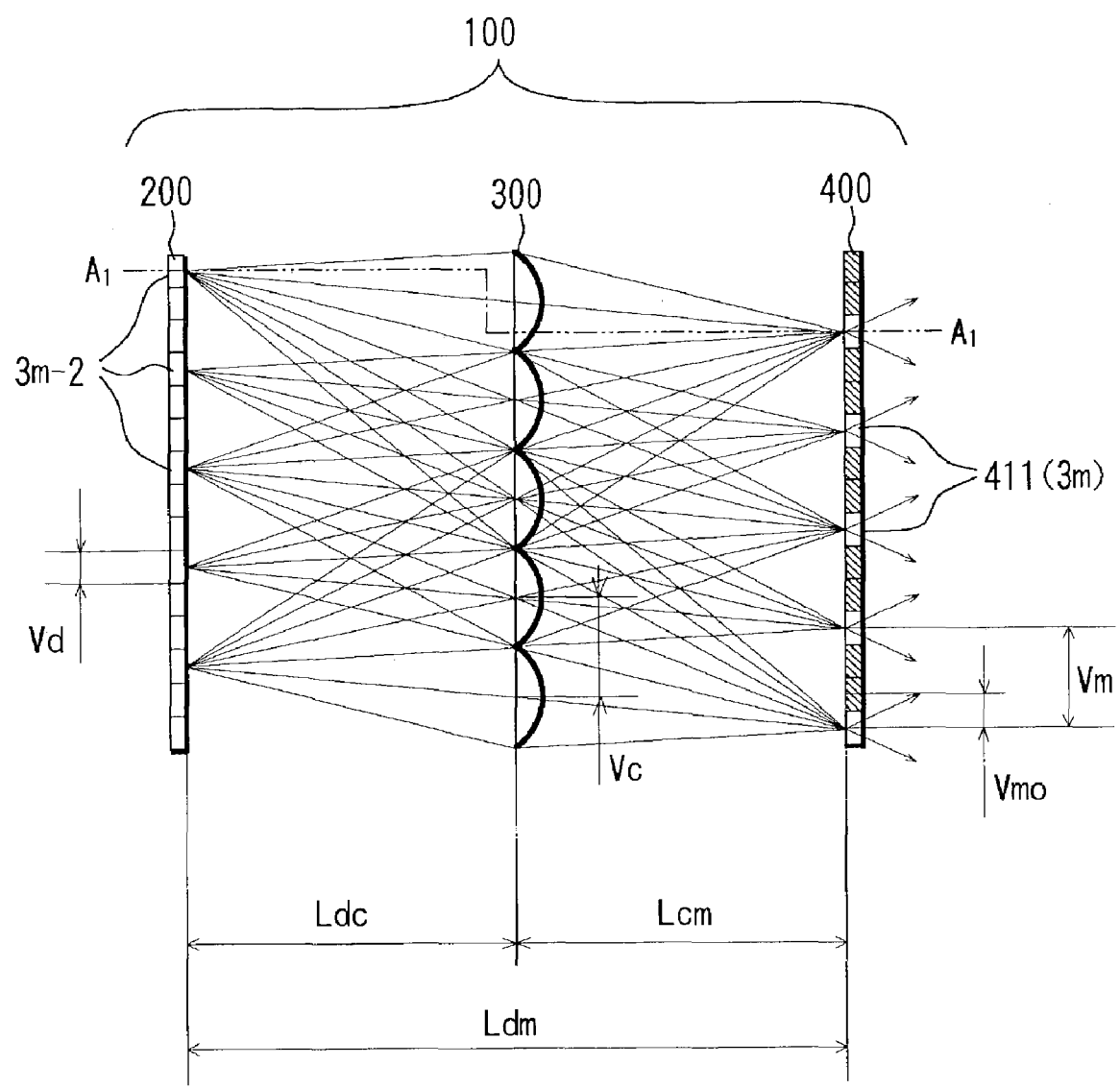
FIG. 4 is a vertical section showing rays of light incident on optical mask apertures from pixels in the stereoscopic image display apparatus according to the Embodiment 1.
Figure 5:
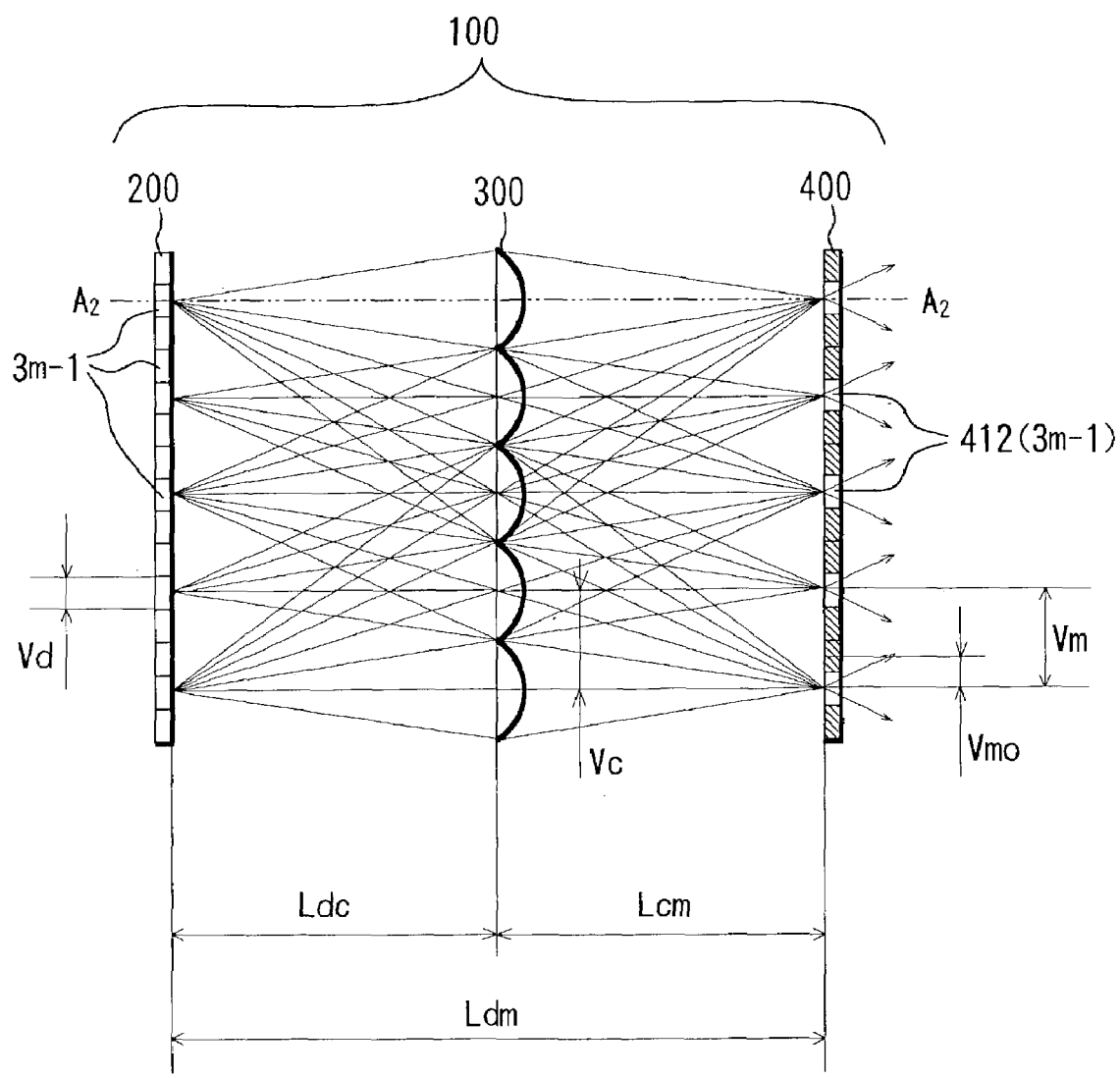
FIG. 5 is a vertical section showing rays of light incident on optical mask apertures from pixels in the stereoscopic image display apparatus according to the Embodiment 1.
Figure 6:
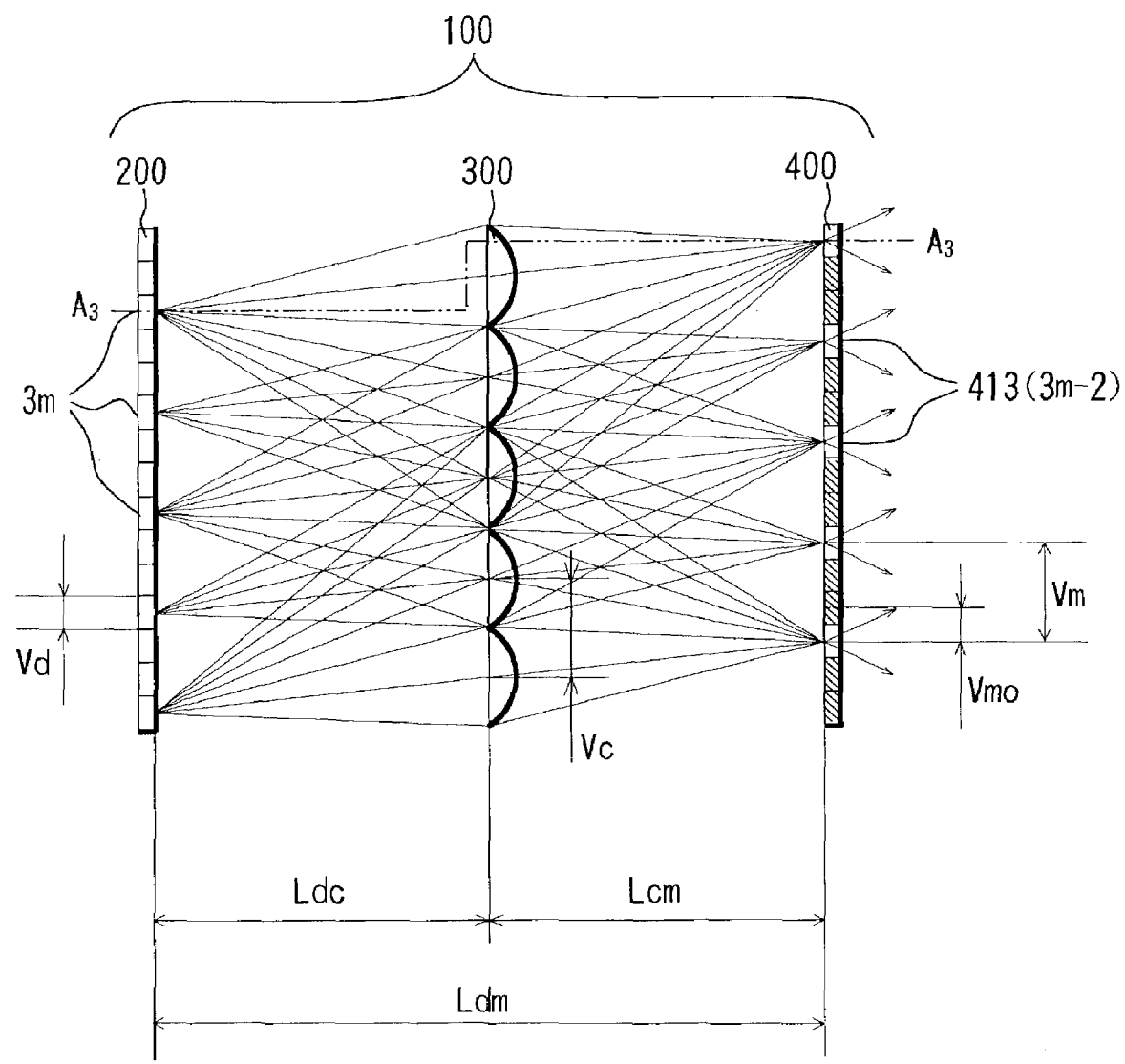
FIG. 6 is a vertical section showing rays of light incident on optical mask apertures from pixels in the stereoscopic image display apparatus according to the Embodiment 1.

FIGS. 4, 5, and 6 show actions of such lenticular lens 300.

FIG. 4 is a vertical section taken in an aperture portion 411 that is the aperture portion in the third row, the first column of each mask block 410.

Rays of light emerged from pixels in the first row in each pixel block 210 on the display unit 200 are substantially condensed in a position of the aperture portion 411 that is the aperture portion in the third row (the (3×m)-th row, that is, the 3rd/6th/9th/12th/ . . . row in terms of the entire mask 400, where m is an integer of one or more) of each mask block 410 to pass through the aperture portion 411. In addition, rays of light passing through each aperture portion 411 divergently advance in the vertical direction.

At this time, a vertical center of a pixel in the first row of each pixel block 210, a vertical center of each cylindrical lens portion of the lenticular lens 300, and a vertical center of the aperture portion 411 of each mask block 410 line up on a straight line whose mask side drops by height difference between the pixel in the first row and the aperture portion 411. Such positional relation also stands up for the (3×m−2)-th row, that is, the 1st/4th/7th/10th/ . . . row in terms of the entire display unit 200, where m is an integer of one or more. Moreover, a display surface of the display unit 200 and a shading surface of the mask 400 are in optically conjugated positional relation in a vertical plane by the cylindrical lens portions of the lenticular lens 300.

FIG. 5 is a vertical section taken in an aperture portion 412 that is the aperture portion in the second row, the third column of each mask block 410.

Rays of light emerged from pixels in the second row in each pixel block 210 on the display unit 200 are substantially condensed in a position of the aperture portion 412 that is the aperture portion in the second row (the (3×m−1)-th row, that is, the 2nd/5th/8th/11th/ . . . row) in terms of the entire mask 400) of each mask block 410 to pass through the aperture portion 412. In addition, rays of light passing through each aperture portion 412 divergently advance in the vertical direction.

At this time, a vertical center of a pixel in the second row of each pixel block 210, a vertical center of each cylindrical lens portion of the lenticular lens 300, and a vertical center of the aperture portion 412 of each mask block 410 line up on a straight line. Such positional relation also stands up for the (3×m−1)-th row, that is, the 2nd/5th/8th/11th/ . . . row in terms of the entire display unit 200, where m is an integer of one or more. Moreover, a display surface of the display unit 200 and a shading surface of the mask 400 are in optically conjugated positional relation in a vertical plane by the cylindrical lens portions of the lenticular lens 300.

FIG. 6 is a vertical section taken in an aperture portion 413 that is the aperture portion in the first row, the fifth column of each mask block 410.

Rays of light emerged from pixels in the third row in each pixel block 210 on the display unit 200 are substantially condensed in a position of the aperture portion 413 that is the aperture portion in the first row (the (3×m−2)-th row, that is, a 1st/4th/7th/10th/ . . . row in terms of the entire mask 400) of each mask block 410 to pass through the aperture portion 413. In addition, rays of light passing through each the aperture portion 413 divergently advance in the vertical direction.

At this time, a vertical center of a pixel in the third row of each pixel block 210, a vertical center of each cylindrical lens portion of the lenticular lens 300, and a vertical center of the aperture portion 413 of each mask block 410 line up on a straight line whose mask side rises by height difference between the pixel in the third row and the aperture portion 413. Such positional relation also stands up for the (3×m)-th row, that is, the 3rd/6th/9th/12th/ . . . row in terms of the entire display unit 200, where m is an integer of one or more. Moreover, a display surface screen of the display unit 200 and a shading surface of the mask 400 are in optically conjugated positional relation in a vertical plane by the cylindrical lens portions of the lenticular lens 300.

Here, when Ldc is the distance between the display surface of the display unit 200 and the lenticular lens 300, Lcm is the distance between the lenticular lens 300 and the shading surface of the mask 400, Ldm is the distance between the display surface of the display unit 200 and the shading surface of the mask 400, fc is a focal length of the cyclindrical lens portion of the lenticular lens 300 in a vertical section, Vd is the length of a vertical side of one pixel (vertical pitch of pixels) of the display unit 200, Vc is the vertical length of one of the cylindrical lens portion (vertical pitch of the cylindrical lens portions) constituting the lenticular lens 300, and Vmo is a vertical pitch of aperture portions of the mask 400, the following relations stand up.

$$1/fc = 1/Ldc + 1/Lcm \tag{1}$$

$$Vd:Ldc = Vmo:Lcm \tag{2}$$

$$2 \times p \times Vd:Ldm = Vc:Lcm \tag{3)-1}$$

$$2 \times Vm:Ldm = Vc:Ldc \tag{3)-2}$$

$$p \times Vd:Ldc = Vm:Lcm \tag{4}$$

Here, p is a number of pixel rows (lines) corresponding to each cylindrical lens portion constituting the lenticular lens 300. In this embodiment, a case where p is three is described. However, since expressions (3)-1 and (3)-2 are in subordinative relation, either of them stands up independently.

(Formation of Viewpoint Lines)

Figure 7:
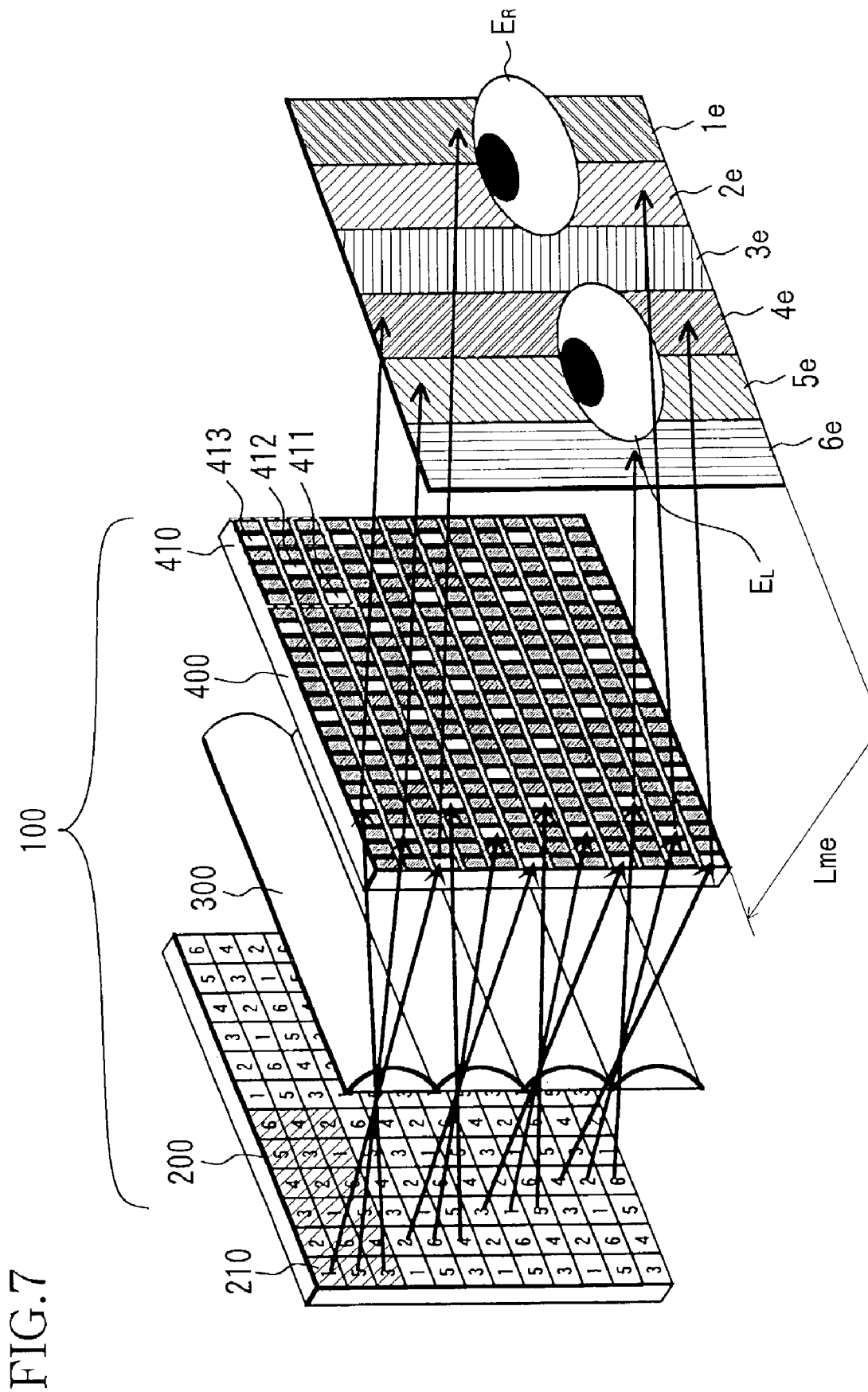
FIG. 7 is a perspective view for explaining the formation of observation areas in the stereoscopic image display apparatus according to the Embodiment 1.

As shown in FIG. 7, rays of light radially emerged from pixels on the display unit 200 are given a vertical lens action by the lenticular lens 300, and become rays of light with directivity by the mask 400. Then, these rays of light form multiviewpoint image lines including six viewpoints (these are areas having width at some extent) 1e, 2e, 3e, 4e, 5e, and 6e apart at the distance Lme from the mask 400.

Owing to this, an observer can observe parallax images from the viewpoints 1e, 2e, 3e, 4e, 5e, and 6e by his/her left eye EL and right eye ER.

Figure 8:
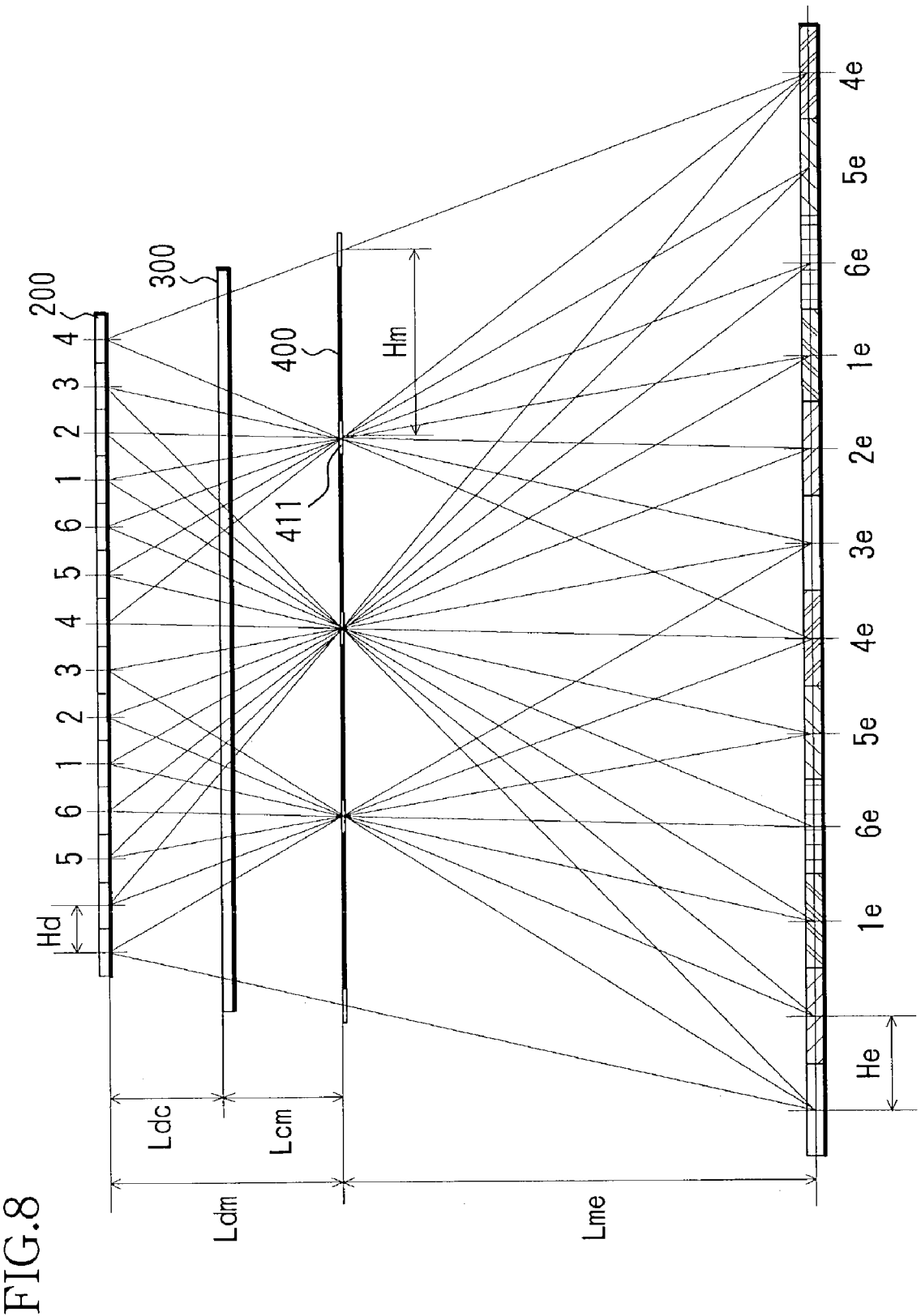
FIG. 8 is a horizontal section of the stereoscopic image display apparatus according to the Embodiment 1.
Figure 9:
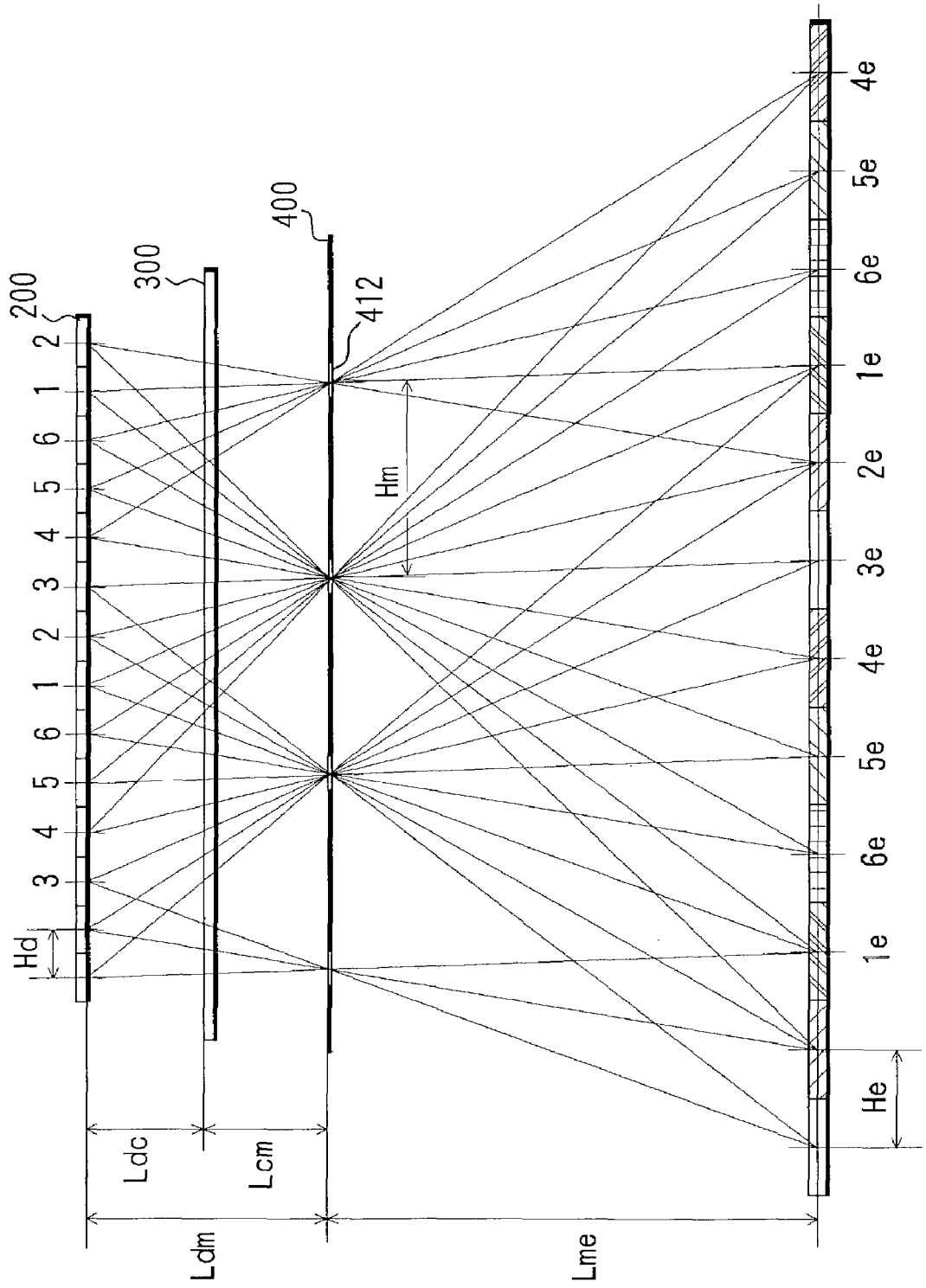
FIG. 9 is a horizontal section of the stereoscopic image display apparatus according to the Embodiment 1.
Figure 10:
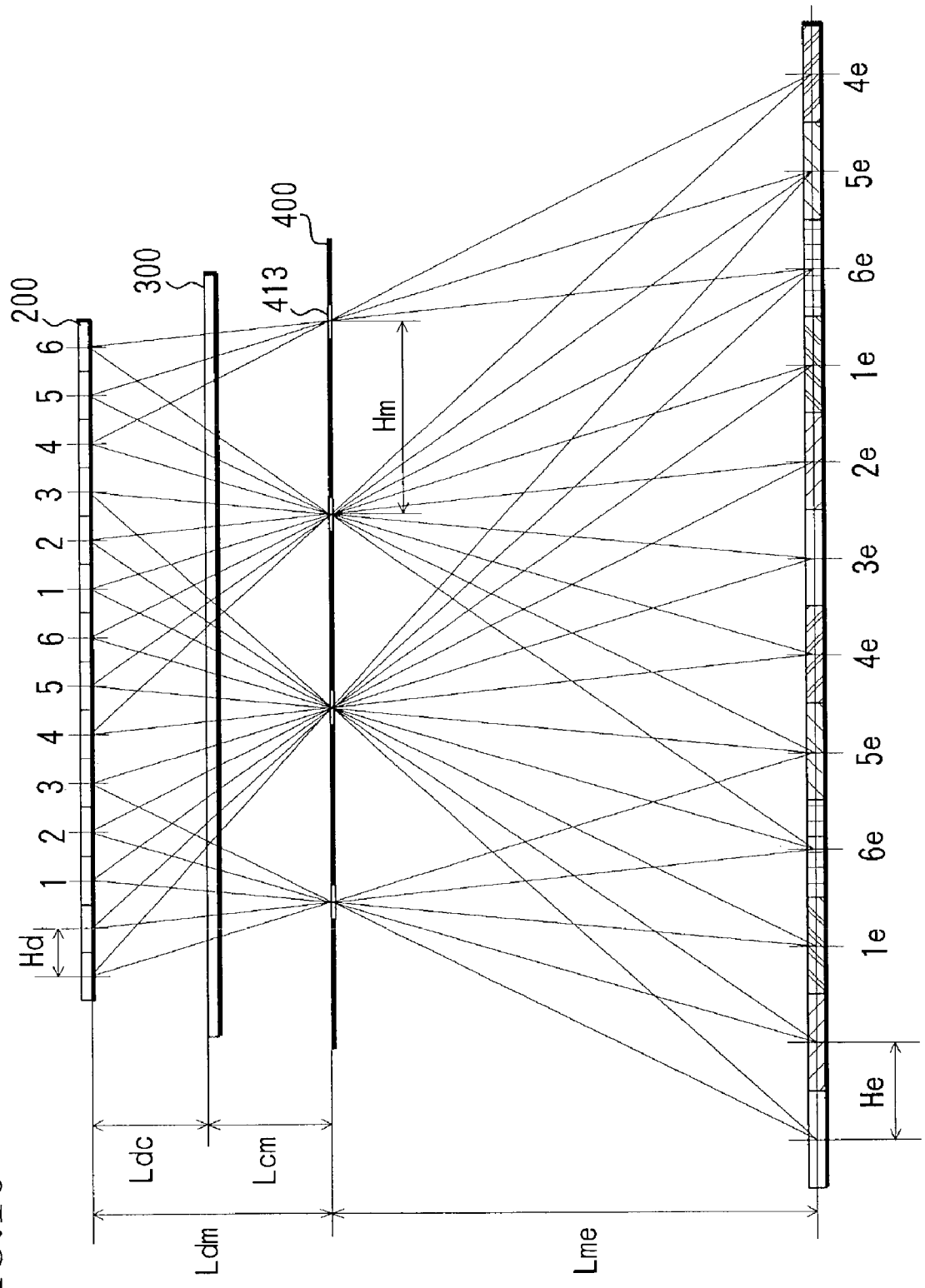
FIG. 10 is a horizontal section of the stereoscopic image display apparatus according to the Embodiment 1.

FIGS. 8, 9, and 10 are sectional views in aperture portions of the mask 400, and the principle of forming the multiviewpoint image lines in the viewpoints will be described by using these drawings hereafter.

FIG. 8 shows a horizontal section taken on line A1—A1 in FIG. 4.

As shown in FIG. 8, rays of light from pixels in the first row (the (3×m−2)-th row in terms of the entire display unit 200: m is an integer of one or more) in each pixel block 210 on the display unit 200 pass through the aperture portion 411 in the third row (the (3×m)-th row in terms of the entire mask 400: m is an integer of one or more) of each mask block 410 in the mask 400. Then, rays of light from a pixel 1 in the first row forms the strip-shaped viewpoint 1e with width He apart at the distance Lme from the mask 400. In this manner, rays of light from all the pixels 1 on the display unit 200 pass through the aperture portions 411 of the mask 400 to form a plurality of the strip-shaped viewpoints 1e with the width He. In addition, since similar relations also stand up for pixels 2 to 6 other than the pixel 1, rays of light from them form the strip-shaped viewpoints 2e to 6e with the width He apart at the distance Lme from the mask 400.

At this time, the positional relation that a horizontal center of each pixel of the first row on the display unit 200, a horizontal center of each aperture portion 411 of the mask 400, and a center of the width He of each viewpoint line up on a straight line is satisfied.

FIG. 9 shows a horizontal section taken on line A2—A2 in FIG. 5.

As shown in FIG. 9, rays of light from pixels in the second row (the (3×m−1)-th row in terms of the entire display unit 200: m is an integer of one or more) in each pixel block 210 on the display unit 200 pass through the aperture portion 412 in the second row (the (3×m−1)-th row in terms of the entire mask 400: m is an integer of one or more) of each mask block 410 in the mask 400. Then, rays of light from a pixel 5 in the second row forms the strip-shaped viewpoint 5e with the width He apart at the distance Lme from the mask 400. In this manner, rays of light from all the pixels 5 on the display unit 200 pass through the aperture portions 412 of the mask 400 to form the strip-shaped viewpoints 5e with the width He. In addition, since similar relations also stand up for pixels 1 to 4, and 6 other than the pixel 5, rays of light from them form the strip-shaped viewpoints 1e to 4e, and 6e with the width He apart at the distance Lme from the mask 400.

At this time, the positional relation that a horizontal center of each pixel of the second row on the display unit 200, a horizontal center of each aperture portion 412 of the mask 400, and a center of the width He of each viewpoint line up on a straight line is satisfied.

FIG. 10 shows a horizontal section taken on line A3—A3 in FIG. 6.

As shown in FIG. 10, rays of light from pixels in the third row (the (3×m)-th row in terms of the entire display unit 200: m is an integer of one or more) in each pixel block 210 on the display unit 200 pass through the aperture portion 413 in the first row (the (3×m)-th row in terms of the entire mask 400: m is an integer of one or more) of each mask block 410 in the mask 400. Then, rays of light from a pixel 3 in the third row forms the strip-shaped viewpoint 3e with the width He apart at the distance Lme from the mask 400. In this manner, rays of light from all the pixels 3 on the display unit 200 pass through the aperture portions 413 of the mask 400 to form the strip-shaped viewpoints 3e with the width He. In addition, since similar relations also stand up for pixels 1, 2, 4 to 6 other than the pixel 3, rays of light from them form the strip-shaped viewpoints 1e, 2e, 4e to 6e with the width He apart at the distance Lme from the mask 400.

At this time, the positional relation that a horizontal center of each pixel of the third row on the display unit 200, a horizontal center of each aperture portion 413 of the mask 400, and a center of the width He of each viewpoint line up on a straight line is satisfied.

In addition, when Ldm is the distance between the display surface of the display unit 200 and the shading surface of the mask 400, Lme is the distance from the shading surface of the mask 400 to viewpoints 1e to 6e, Hd is the center distance of adjacent pixels in the horizontal direction (a horizontal pitch of pixels) on the display unit 200, Hm is the cross side length of the mask block 410 (a horizontal pitch of the mask block 410: refer to FIG. 2) in the mask 400, Hmo is each horizontal center distance between aperture portions 411, 412, and 413 of the mask 400 (a horizontal pitch of the aperture portions: refer to FIG. 2), and He is a horizontal pitch of viewpoints, the following relations stand up:

$$Ldc + Lcm = Ldm \quad (5)$$

$$Hd:Ldm = He:Lme \quad (6)$$

$$N1 \times Hd:Ldm + Lme = Hm:Lme \quad (7)$$

Here, N1 is a number of viewpoints. In this embodiment, a case where N1 is six is described.

Figure 11:
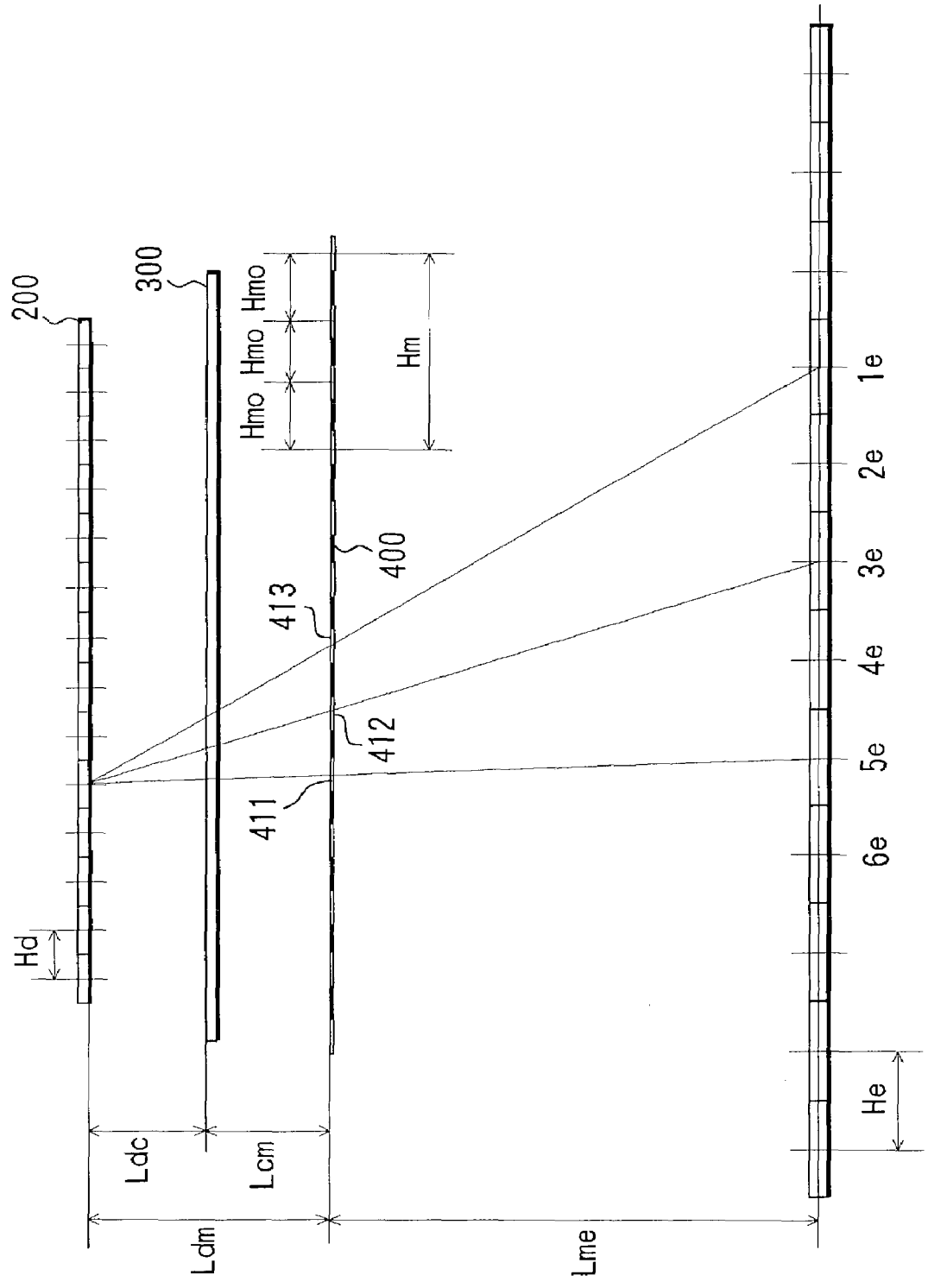
FIG. 11 is a horizontal section of the stereoscopic image display apparatus according to the Embodiment 1.

FIG. 11 is a top view in the case that the aperture portions 411, 412, and 413 of the mask 400 are assumed to exist on the same horizontal plane. In this case, the following relation stands up:

$$Hmo:Ldm = 2 \times He:Ldm + Lme \quad (8)$$

(Horizontal Aperture Rate of Aperture Portion)

Figure 12:
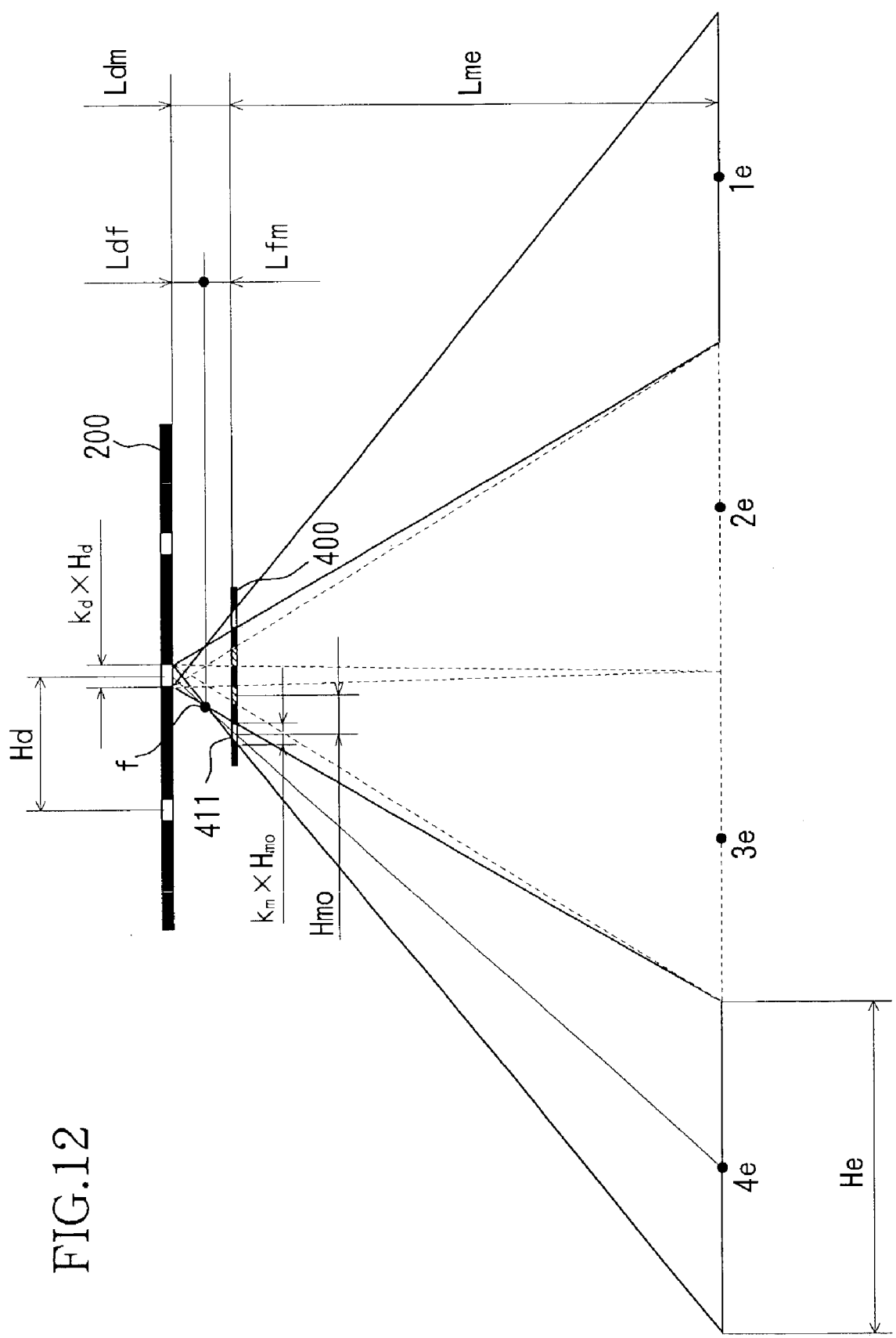
FIG. 12 is a horizontal section of the stereoscopic image display apparatus according to the Embodiment 1 in the vicinity of an observer's left eye EL.

FIG. 12 is a drawing showing a section taken on line A1—A1 in FIG. 4 and is for explaining an aperture portion of a pixel of the display unit 200 and an aperture portion 411 of the mask 400 in detail. In addition, positions of the aperture portions 412 and 413 that do not exist in the section shown in FIG. 12 are shown as hatched areas.

In the drawing, reference character kd denotes a horizontal aperture rate of the aperture portion of the pixel on the display unit 200, and reference character km denotes a horizontal aperture rate of the aperture portion 411 in the mask 400. Owing to this, the horizontal length of the aperture portion of the pixel on the display unit 200 is kd×Hd, and the horizontal length of the aperture portion 411 in the mask 400 is km×Hmo.

As shown in the drawing, the left edge of the aperture portion of the pixel on the display unit 200, the right edge of the aperture portion 411 in the mask 400, and right edges of the viewpoints 1e and 4e with the width He line up on each straight line.

Similarly, the right edge of the aperture portion of the pixel on the display unit 200, the left edge of the aperture portion 411 in the mask 400, and left edges of the viewpoints 1e and 4e with the width He line up on each straight line.

When f is an intersection of these straight lines, Ldf is the distance from the display unit 200 to the intersection f, and Lfm is the distance from the intersection f to the mask 400, the following relations stand up:

$$Ldm = Ldf + Lfm \qquad (9)$$

$$kd \times Hd : Ldf = km \times Hmo : Lfm \qquad (10)$$

$$kd \times Hd : Ldf = He : Lme + Lfm \qquad (11)$$

A light efficiency lowers by these aperture limitations. Nevertheless, though a general display unit diverges light also to an area that an observer cannot visually identify, this embodiment emerges light with aiming at observer's eyes, and hence, even if a light efficiency is low, a display image can be observed with sufficient brightness.

In this embodiment, a stereoscopic image display apparatus 100 is constituted so as to satisfy the conditional expressions (1), (2), (3)-1, (3)-2, (4), (5), (6), (7), (8), (9), (10), and (11) that are above described.

The stereoscopic image display apparatus 100 with such structure forms the viewpoints 1e, 2e, 3e, 4e, 5e, and 6e in a position apart at the distance Lme from the mask 400.

Images displayed in the stereoscopic image display apparatus 100 will be described by using FIG. 13. In the drawing, reference numeral 500 denotes a camera group, which is constituted of six cameras 501 to 506.

Reference numeral 600 denotes an object. The camera 501 takes an image 1 (this will be described later) seen from the viewpoint 1e. Hereafter, the camera 502 takes an image 2 seen from the viewpoint 2e, the camera 503 takes an image 3 seen from the viewpoint 3e, the camera 504 takes an image 4 seen from the viewpoint 4e, the camera 505 takes an image 5 seen from the viewpoint 5e, and the camera 506 takes an image 6 seen from the viewpoint 6e.

Therefore, image-taking optical axes of the cameras 501, 502, 503, 504, 505, and 506 are arranged on the same horizontal plane at equal intervals He.

Reference numeral 510 denotes a viewpoint image group at the time when the camera group 500 takes images of an object 600. A viewpoint image 512 (image 2) is taken by the camera 502, a viewpoint image 513 (image 3) is taken by the camera 503, a viewpoint image 514 (image 4) is taken by the camera 504, a viewpoint image 515 (image 5) is taken by the camera 505, and a viewpoint image 516 (image 6) is taken by the camera 506.

When the above-mentioned combined parallax image is created from the viewpoint image group 510 consisting of the viewpoint images 511 to 516 taken in this manner and is displayed in the display unit 200, a viewpoint image observed changes by an observer horizontally moving at the distance He or more. Namely, the observed viewpoint image changes to the image of the object having been taken at the position shifting at the distance He when the observer moves at He in the horizontal direction. Owing to this, it is possible to express so-called motion parallax.

(Description of High-resolution Display)

As described in FIG. 2, it is possible in this embodiment to form a desired arrangement pattern (aperture pattern) of aperture portions in the mask 400. In this embodiment, it is made not only to obtain six types of combined parallax images by switching positions of pixels displaying respective viewpoint images in the display unit 200 by the control of respective driving circuits 250 and 450 with synchronizing signals from the switching controller 500, but also to switch six types of mask aperture patterns in the mask 400 with synchronizing with the switching of these combined parallax images.

Figure 14:
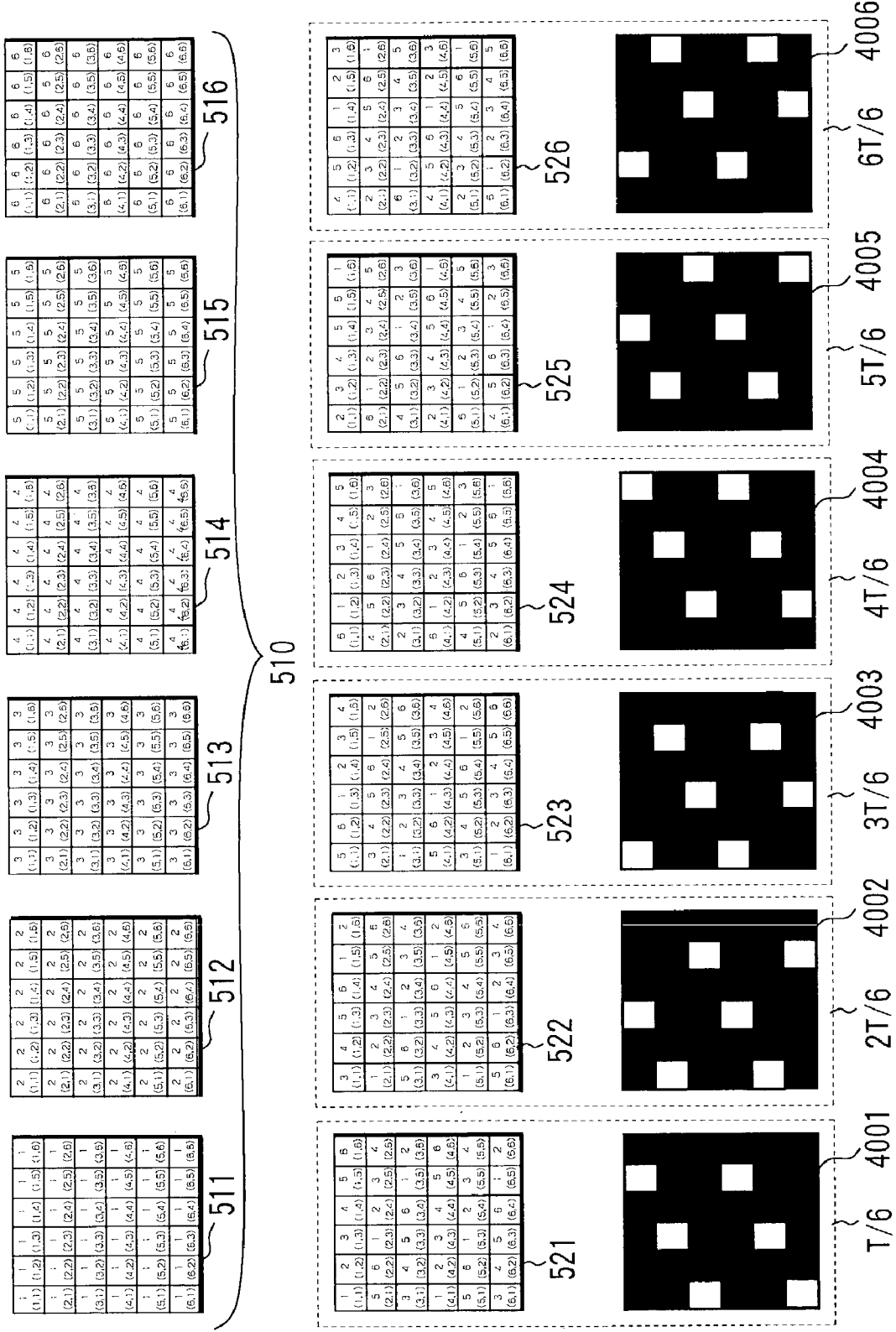
FIG. 14 is a drawing showing the switching of combined parallax images and mask patterns in the stereoscopic image display apparatus according to the Embodiment 1.

FIG. 14 multiplly shows the relation between six types of combined parallax images 521, 522, 523, 524, 525, and 526, which are created from the viewpoint image group 510 and are displayed in the display unit 200, and six types of mask aperture patterns 4001, 4002, 4003, 4004, 4005, and 4006. In this drawing, it is made that an image display unit has pixels of six rows×six columns. Numerals without parentheses that are described in respective pixels denote the numbers of viewpoint images to be displayed, and numerals with parentheses denote positions (addresses) of the pixels in a matrix. In this embodiment, six types of combined parallax images, each of which is formed by combining six viewpoint images in which arrangement of pixel groups displaying them respectively are different every combined parallax image, are displayed in the display unit 1. In addition, void portions in the mask 400 are aperture portions in the mask patterns 4001 to 4006.

In this embodiment, the mask patterns 4001 to 4006 are switched with synchronizing with the switching of the combined parallax images 521 to 526 displayed in the display unit 200.

In the drawing, the combined parallax images and the mask aperture patterns that are enclosed by dotted lines forms pairs synchronously switched.

Namely, the mask aperture pattern 4001 is selected when the combined parallax image 521 is displayed, the mask aperture pattern 4002 is selected when the combined parallax image 522 is displayed, and the mask aperture pattern 4003 is selected when the combined parallax image 523 is displayed. In addition, the mask aperture pattern 4004 is selected when the combined parallax image 524 is displayed, the mask aperture pattern 4005 is selected when the combined parallax image 525 is displayed, and the mask aperture pattern 4006 is selected when the combined parallax image 526 is displayed.

Pixels 1 to 6 line up in this order in the first and fourth rows of the display unit 200 when the combined parallax image 521 is displayed. In addition, pixels 5, 6, 1, 2, 3, and 4 line up in this order in the second and fifth rows. Moreover, pixels 3, 4, 5, 6, 1, and 2 line up in this order in the third and sixth rows at this time.

Pixels 3, 4, 5, 6, 1, and 2 line up in this order in the first and fourth row of the display unit 200 when the combined parallax image 522 is displayed. In addition, pixels 1 to 6 line up in this order in the second and fifth rows. Moreover, pixels 5, 6, 1, 2, 3, and 4 line up in this order in the third and sixth rows at this time.

Pixels 5, 6, 1, 2, 3, and 4 line up in this order in the first and fourth rows of the display unit 200 when the combined parallax image 523 is displayed. In addition, pixels 3, 4, 5, and 6 line up in this order in the second and fifth rows. Moreover, pixels 1 to 6 line up in this order in the third and sixth rows at this time.

Pixels 6, 1, 2, 3, 4, and 5 line up in this order in the first and fourth rows of the display unit 200 when the combined parallax image 524 is displayed. In addition, pixels 4, 5, 6, 1, 2, and 3 line up in this order in the second and fifth rows. Moreover, pixels 2, 3, 4, 5, 6, and 1 line up in this order in the third and sixth rows at this time.

Pixels 2, 3, 4, 5, 6, and 1 line up in this order in the first and fourth row of the display unit 200 when the combined parallax image 525 is displayed. In addition, pixels 6, 1, 2, 3, 4, and 5 line up in this order in the second and fifth rows. Moreover, pixels 4, 5, 6, 1, 2, and 3 line up in this order in the third and sixth rows at this time.

Pixels 4, 5, 6, 1, 2, and 3 line up in this order in the first and fourth row of the display unit 200 when the combined parallax image 526 is displayed. In addition, pixels 2, 3, 4, 5, 6, and 1 line up in this order in the second and fifth rows. Moreover, pixels 6, 1, 2, 3, 4, and 5 line up in this order in the third and sixth rows at this time.

Furthermore, in this embodiment, not only the display of six type of combined parallax images in which the arrangement patterns of six pixel groups that display six viewpoint images are mutually different are switched in time-sharing, but also the mask aperture patterns are changed as the patterns 4001 to 4006 with synchronizing with this display switching so that rays of light from pixels 1 to 6 may always reach only the first to sixth viewpoints 1e to 6e respectively.

In this manner, it is possible to display respective viewpoint images in high resolution by using all the pixels on the display unit 200 by obtaining afterimage (residual image) effect of the respective viewpoint images by switching the mask aperture patterns 4001–4006 with synchronizing with the switching of the combined parallax images 521 to 526 on the display unit 200.

In other words, according to this embodiment, since six types of combined parallax images and mask aperture patterns are switched, it is possible to display each viewpoint image in six-fold resolution in comparison with an apparatus without such switching.

In addition, it is necessary to switch six types of combined parallax images and mask aperture patterns at the speed not giving an observer flicker feeling. For example, when a switching period T of the mask aperture patterns 4001 to 4006 and combined parallax images 521 to 526 is T=1/60 (repeated at a rate of 60 times a second), it is possible to display a high-resolution stereoscopic image with few flicker feeling by afterimage effect of each viewpoint image.

Moreover, at this time, when paying attention to one viewpoint image observed by an observer's single eye, the number of pixels actually constituting one viewpoint image is equal at each time-sharing stage in a conventional parallax panoramagram system and the system of this embodiment in the case of using display devices with the same pixel counts as the display units 200 (1/6 of the entire pixel count on the display unit 200).

Nevertheless, the conventional parallax panoramagram system has such bias in the arrangement of pixels constituting an image that only the vertical resolution is high and horizontal resolution is low. Hence, the directional balance of resolution is bad.

On the other hand, the system of this embodiment disperses pixel groups vertically and horizontally, and switches combined parallax images and mask aperture patterns at high speed so as to obtain the afterimage effect of all the viewpoint images. Hence, it is possible to obtain high-resolution viewpoint images with good directional balance.

Then, it is possible to observe a high-resolution stereoscopic image by observing two out of such six viewpoint images with good resolution balance from three directions with both eyes.

In addition, an example is shown in this embodiment, the example which displays each of the viewpoint images by using substantially all the pixels in the display unit by temporally switching six types of pixel arrangement and mask aperture arrangement. However, this causes flicker when display-switching speed of a display unit and a liquid crystal mask is slow. In this case, for example, by performing display with switching three types of pixel arrangement and aperture arrangement to six viewpoints, it is possible to display six viewpoint images in three-fold resolution without flicker feeling in comparison with the case of not performing switching. In addition, this technology is effective also when the number of viewpoints increases.

(Modified Example of Embodiment 1)

Figure 15:
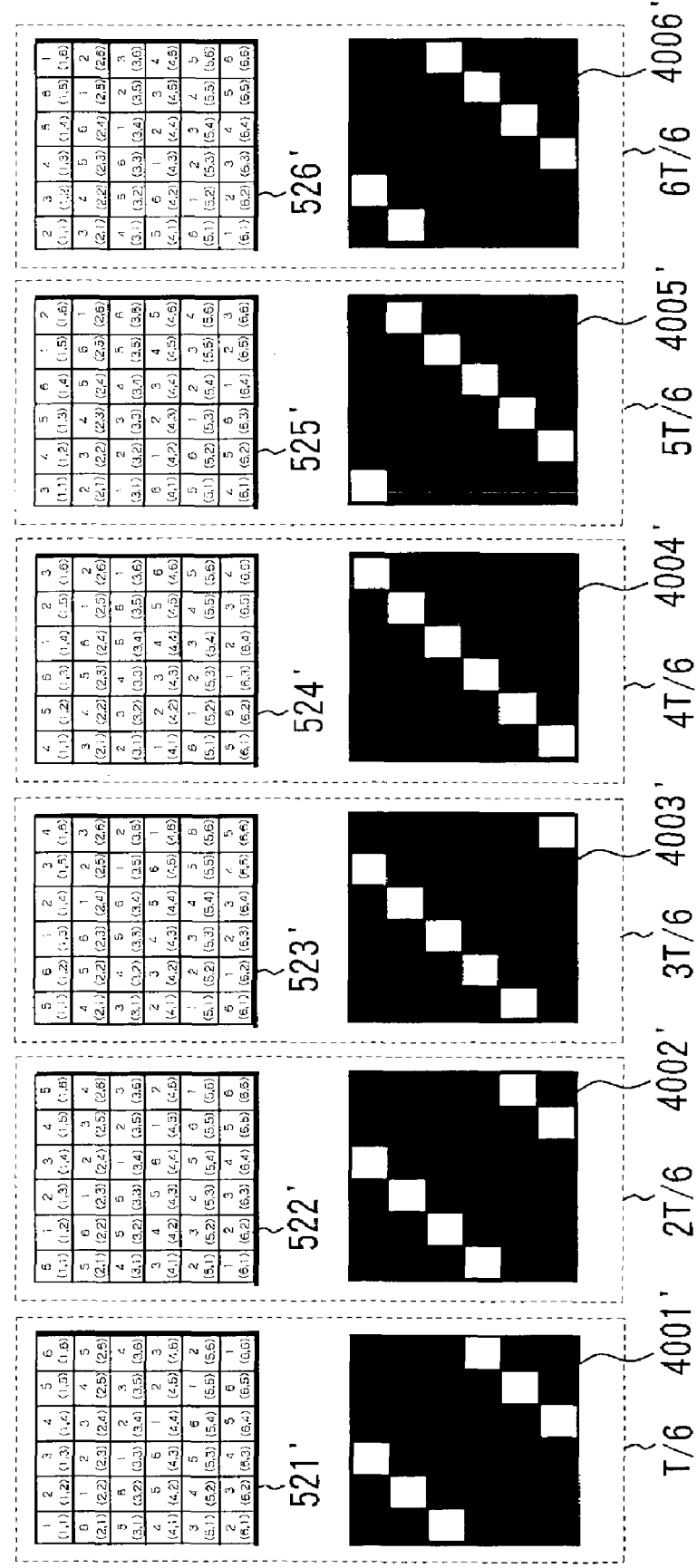
FIG. 15 is a drawing showing the switching of combined parallax images and mask patterns in a stereoscopic image display apparatus that is a modified example of the Embodiment 1.
Figure 16:
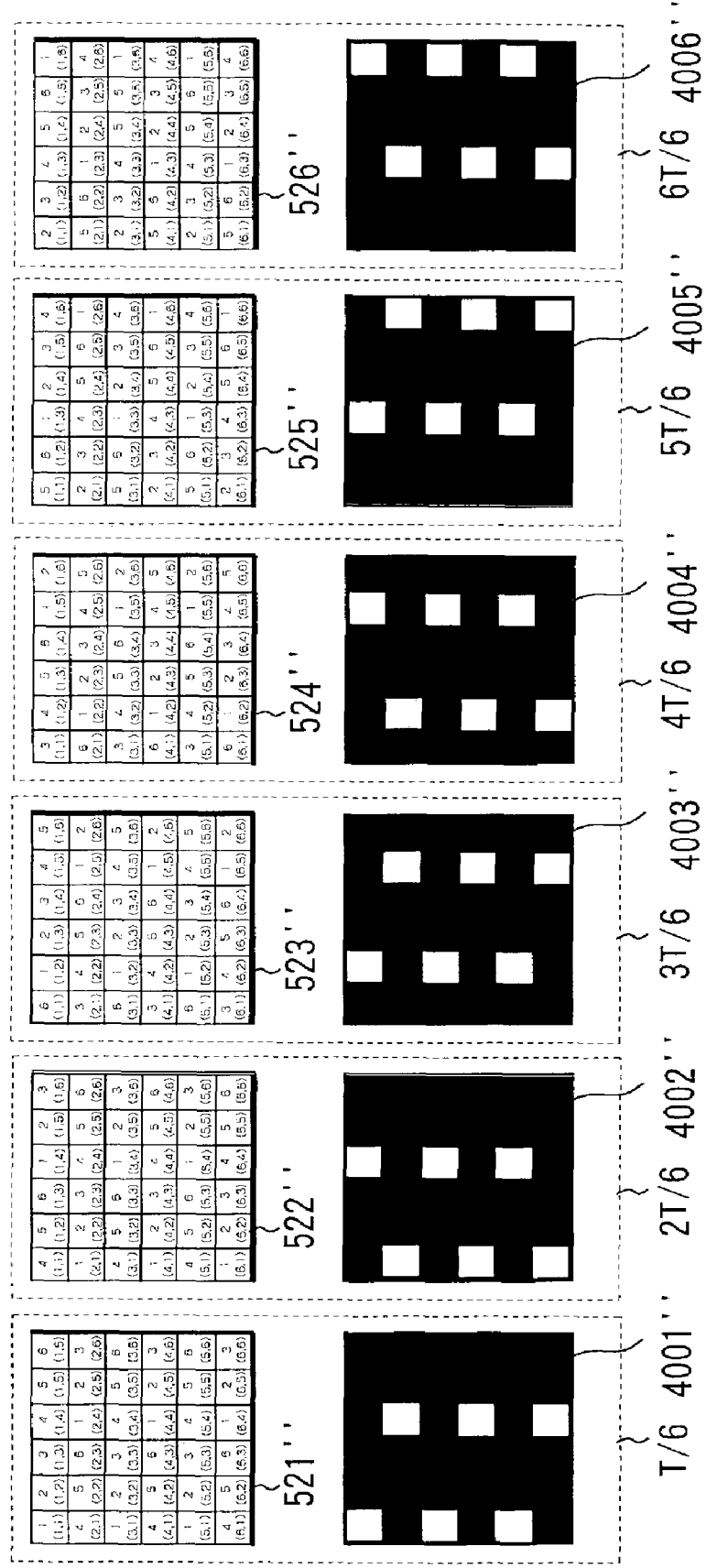
FIG. 16 is a drawing showing the switching of combined parallax images and mask patterns in a stereoscopic image display apparatus that is another modified example of the Embodiment 1.

FIGS. 15 and 16 show two examples different respectively from the above-described embodiment having six types of combined parallax images and mask aperture patterns that are switched with synchronizing with one another.

In both drawings, the combined parallax images and mask aperture patterns that are enclosed by dotted lines form pairs synchronously switched.

In FIGS. 15 and 16, mask aperture patterns 4001' and 4001" are selected when combined parallax images 521' and 521" are displayed, mask aperture patterns 4002' and 4002" are selected when combined parallax images 522' and 522" are displayed, and mask aperture patterns 4003' and 4003" are selected when combined parallax images 523' and 523" are displayed. In addition, mask aperture patterns 4004' and 4004" are selected when combined parallax image 524' and 524" are displayed, mask aperture patterns 4005' and 4005" are selected when combined parallax images 525' and 525" are displayed, and mask patterns 4006' and 4006" are selected when combined parallax images 526' and 526" are displayed.

Pixels displaying each viewpoint image on the display unit 200 shift horizontally by one pixel every row in the example shown in FIG. 15. In addition, pixels displaying each viewpoint image on the display unit 200 shift horizontally by three pixels every row in the example shown in FIG. 16.

Namely, arrangement patterns of pixel groups displaying respective viewpoint images on the display unit so that pixels vertically adjacent to each other are pixels of different pixel groups.

Then, in the example shown in FIG. 15, the combined parallax images 521' to 526' correspond to ones that pixels shift by one pixel every row (arrangement patterns of pixel groups displaying respective viewpoint images are different from one another). In addition, the combined parallax images 521" to 526" correspond to ones that pixels shift by three pixels every row in the example shown in FIG. 16.

Even if the combined parallax images and mask aperture patterns that are shown in FIGS. 15 and 16 are switched, it is possible to obtain the effect similar to that in the above-described embodiment.

In addition, in the above-described embodiment, a case that a liquid crystal panel is used as the mask 400 and mask aperture patterns are switched by driving this liquid crystal panel is described. Nevertheless, it is also good to mechanically change a relative horizontal position with the display unit 200 by using a mask horizontally having two blocks of fixed aperture patterns instead of the mask 400.

For example, in FIG. 14, a mask aperture pattern same as that of the mask aperture pattern 4005 is obtained when a mask having two blocks of mask aperture patterns 4001 is horizontally moved by one aperture portion at the left. In addition, a mask aperture pattern same as that of the mask aperture pattern 4002 is obtained when the mask is horizontally moved by two aperture portions, a mask aperture pattern same as that of the mask aperture pattern 4006 is obtained when the mask is horizontally moved by three aperture portions, a mask pattern same as that of the mask aperture pattern 4003 is obtained when the mask is horizontally moved by four aperture portions, and a mask aperture pattern same as that of the mask aperture pattern 4004 is obtained when the mask is horizontally moved by five aperture portions.

In this manner, according to this embodiment, it is possible to display a high-resolution stereoscopic image by dispersing pixel groups, displaying one viewpoint image, respectively vertically and horizontally, and switching combined parallax images and mask aperture patterns at high speed so as to obtain the afterimage effect of all the viewpoint images.

(Embodiment 2)

Figure 17:
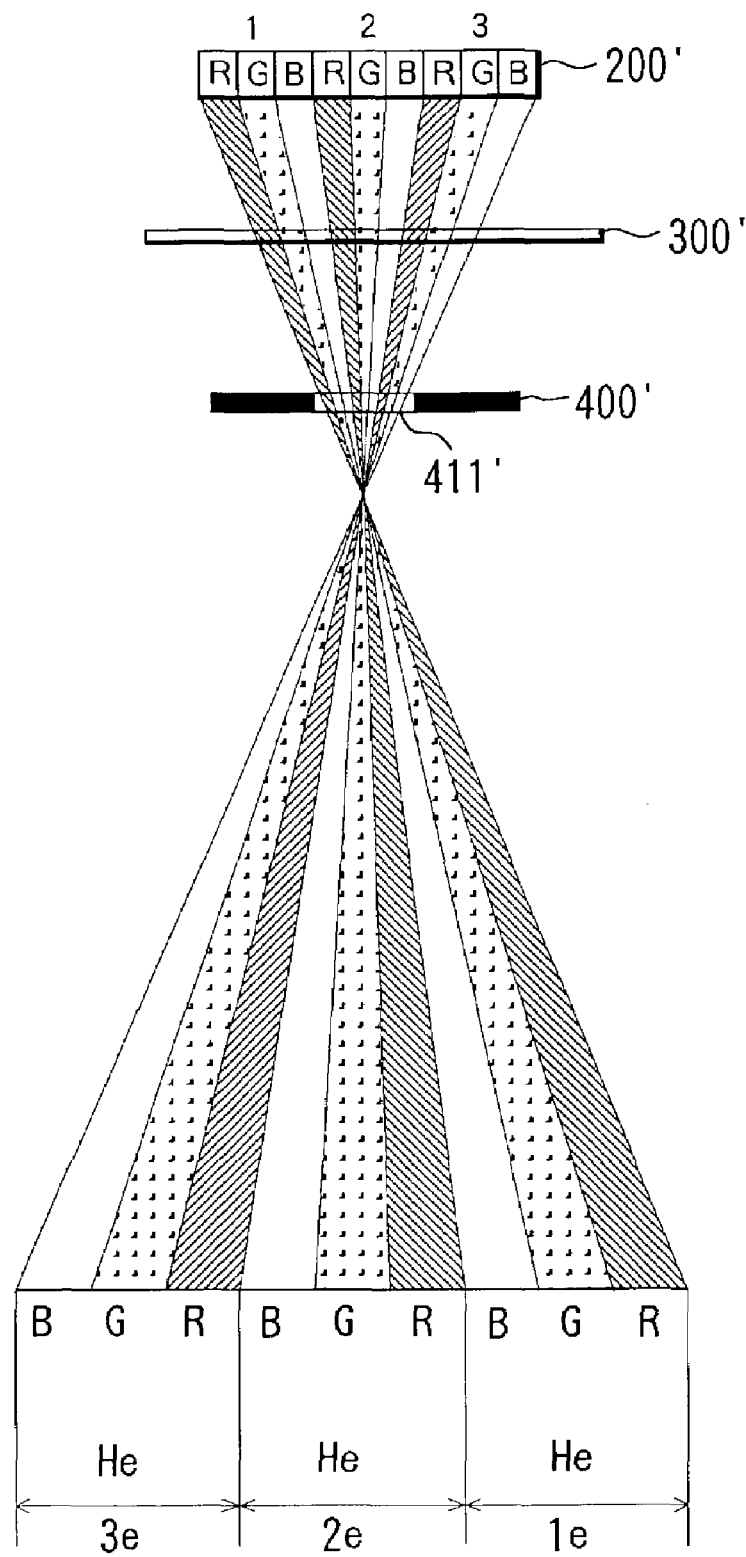
FIG. 17 is an explanatory diagram for explaining color separation in viewpoints.

FIG. 17 is an explanatory diagram for explaining the principle that color separation arises in a viewpoint when one pixel on a display unit is constituted by subpixels having 3 (=n) colors of red (R), blue (B), and green (G), and viewpoint images are displayed every subpixel.

In addition, FIG. 17 is a section in pixels in a first row when one pixel on the display unit 200 is constituted by three subpixels (n colors of pixels), which is shown in the Embodiment 1.

As shown in FIG. 17, in the display unit 200', subpixels of R, B, and G corresponding to three pixels line up in the horizontal direction.

Rays of light emerged from the subpixels constituting pixels 1, 2, and 3 on the display unit 200' pass through an aperture portion 411' in a mask 400' by receiving an optical action of a lenticular lens 300' to form strip-shaped viewpoints 1e, 2e, and 3e with width He.

At this time, as shown in the drawing, images by red subpixels R arranged in left ends of pixels 1, 2, and 3 on the display unit 200' are formed in respective right edge portions of viewpoints 1e to 3e with the width He as shown by hatched areas in the drawing.

Similarly, images by rays of light emerged from green subpixels G are formed in a center portion of each viewpoint in the horizontal direction, as shown by dotted area and images by rays of light emerged from blue subpixels B are formed in a left edge portion of each viewpoint. In addition, these relations are also similar in other pixels.

When an observer observes these images, there is a possibility that so-called color separation that color images are separately recognized visually arises since the observer observes at least one of images of R, G, and B formed in one viewpoint, and at least one of images of R, G, and B in a viewpoint adjacent to the viewpoint at the same time.

In addition, in the Embodiment 1, such color separation does not arise when a monochrome display unit, a display unit with horizontally striped RGB subpixels, or a display unit of forming images on a screen is used.

Figure 18:
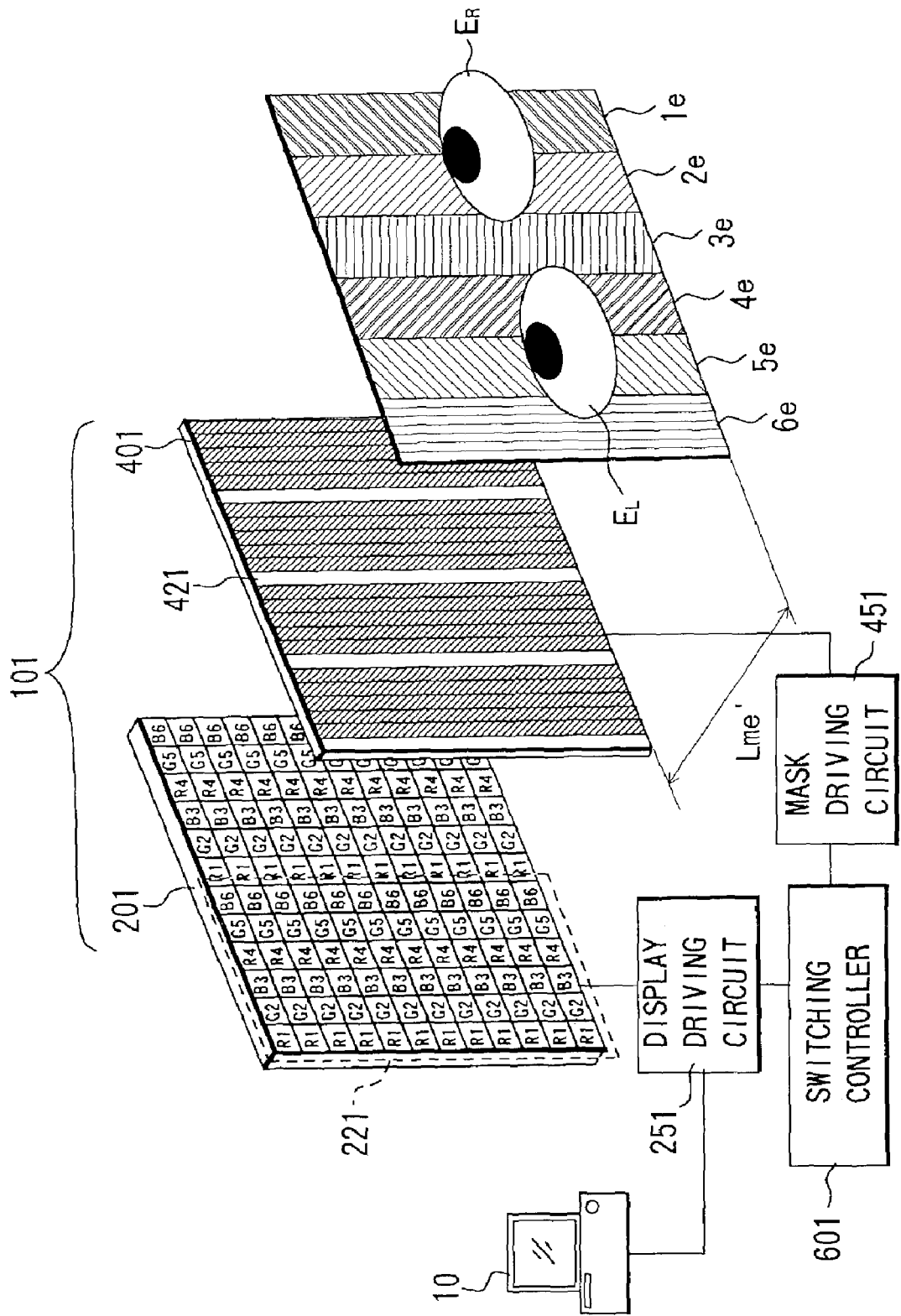
FIG. 18 is a perspective view showing the structure of a multiviewpoint type stereoscopic image display apparatus that is Embodiment 2 of the present invention.

FIG. 18 shows the structure of a stereoscopic image display apparatus that is Embodiment 2 of the present invention. This embodiment aims to eliminate the above-described color separation.

(Description of Stereoscopic Image Display Apparatus 101)

As shown in FIG. 18, a stereoscopic image display apparatus 101 according to this embodiment is a so-called parallax barrier system of multieye type stereoscopic image display apparatus. The parallax barrier system comprises a display unit 201 and a mask 401, and uses a vertically striped barrier also shown in the conventional example.

(Display Unit 201)

The display unit 201 is a display device in which pixels are arranged in a matrix, and moreover, one pixel is constituted by subpixel of three colors of R, G, and B. For example, a liquid crystal display unit, a plasma display unit, an organic electroluminescence display unit, and a projector are typical. A display driving circuit 251 that drives this display unit 201 is given image information from an image information supplying apparatus such as a personal computer, a VCR, or a DVD player that is not shown. Then, the display driving circuit 251 drives respective pixels of the display unit 201 according to the image information.

As shown in FIG. 18, the display unit 201 is constituted by a so-called vertical-stripe color filter in which sets of subpixels of R, G, and B each set of which constitutes one subpixel column line up horizontally in predetermined order.

Concretely, when the number of viewpoint images that can be observed in an observation area is six, subpixel columns are repeatedly arranged horizontally in predetermined order on the display unit 201. Wherin, in each of subpixel columns subpixels of pixels displaying the substantially same portion in the six viewpoint images are arranged in a vertical strip shape (long in the vertical direction). The display unit 201 displays a combined parallax image formed by combining six viewpoint images.

In addition, in FIG. 18, numbers of 1 to 6 assigned to subpixels of R, G, and B shown on the display unit 201 show which viewpoint images are displayed by the subpixels respectively.

Then, in the above-described combined parallax image, each subpixel column is constituted by subpixels of the same color, and the subpixel columns of respective colors are arranged horizontally. Namely, vertical-stripe arrangement of subpixels are formed.

In the state shown in FIG. 18, in the display unit 201, subpixels R1 displaying the first viewpoint image are vertically arranged in the first column (the (6×m−5)-th column, that is, the 1st/7th/13th/ . . . column in terms of the entire display unit 201, where m is an integer of one or more). Subpixels G2 displaying the second viewpoint image are vertically arranged in the second column (the (6×m−4)-th column, that is, the 2nd/8th/14th/ . . . column in terms of the entire display unit 201). Subpixels B3 displaying the third viewpoint image are vertically arranged in the third column (the (6×m−3)-th column, that is, the 3rd/9th/16th/ . . . column in terms of the entire display unit 201). Subpixels R4 displaying the fourth viewpoint image are vertically arranged in the fourth column (the (6×m−2)-th column, that is, the 4th/10th/16th/ . . . column in terms of the entire display unit 201). Subpixels G5 displaying the fifth viewpoint image are vertically arranged in the fifth column (the (6×m−1)-th column, that is, the 5th/11th/17th/ . . . column in terms of the entire display unit 201). And, subpixels B6 displaying the sixth viewpoint image are vertically arranged in the sixth column (the (6×m)-th column, that is, the 6th/12th/18th/ . . . column in terms of the entire display unit 201).

Reference numeral 221 in the drawing is one pixel block constituted by vertically arranging a plurality of horizontal subpixel lines, in which subpixels displaying the substantially same portion in six viewpoint images are horizontally arranged, in the same horizontal positions. In this embodiment, the entire combined parallax image is displayed by horizontally arranging a plurality of pixel blocks 221.

FIG. 19 shows examples of six combined parallax images 531, 532, 533, 534, 535, and 536 in this embodiment. Each combined parallax image has an arrangement pattern of pixels group to display a plurality of viewpoint images that is different from those of others.

(Description of Mask 401)

Figure 20:
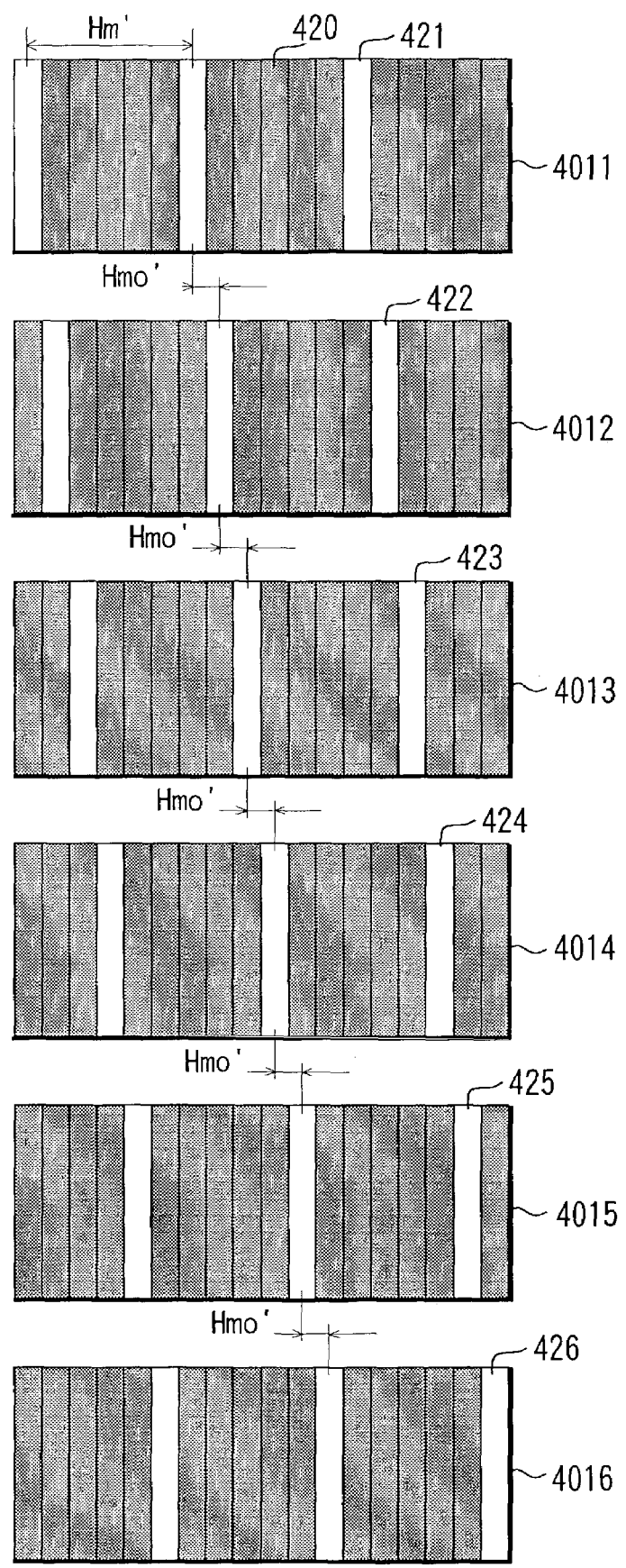
FIG. 20 is a drawing showing examples of mask patterns in the stereoscopic image display apparatus according to the Embodiment 2.

FIG. 20 shows the specific structure of the mask 401. The mask 401 comprises a liquid crystal panel in which vertical-strip units 420 are repeatedly arranged in the horizontal direction, and can form a mask having a desired mask aperture pattern by switching a transmissive area and a shading area among the vertical-strip units 420 by a switching controller 601 and a mask diving circuit 451 shown in FIG. 18.

Mask aperture patterns in this embodiment are six types, that is, 4011, 4012, 4013, 4014, 4015, and 4016 that are shown in FIG. 20. Here, the mask aperture patterns 4011 to 4016 have aperture portions 421, 422, 423, 424, 425, and 426 respectively. The distance between adjacent aperture portions 421 is Hm', and the distance between adjacent aperture portions is Hm' for the aperture portions 422 to 426.

Moreover, the distance between the aperture portions 421 and 422, 422 and 423, 423 and 424, 424 and 425, and 425 and 426 is Hmo'.

(Formation of Viewpoint Lines)

In this embodiment, the combined parallax images and mask aperture patterns that are described in FIGS. 19 and 20 are sequentially switched with synchronizing in pairs of 531 and 4011, 532 and 4012, 533 and 4013, 534 and 4014, 535 and 4015, and 536 and 4016 respectively.

Positions of subpixel groups displaying respective viewpoint images that are combined at the time of displaying respective combined parallax images 531 to 536 are as shown in FIG. 19. A period T when this switching goes around is 1/60 seconds.

Figure 21:
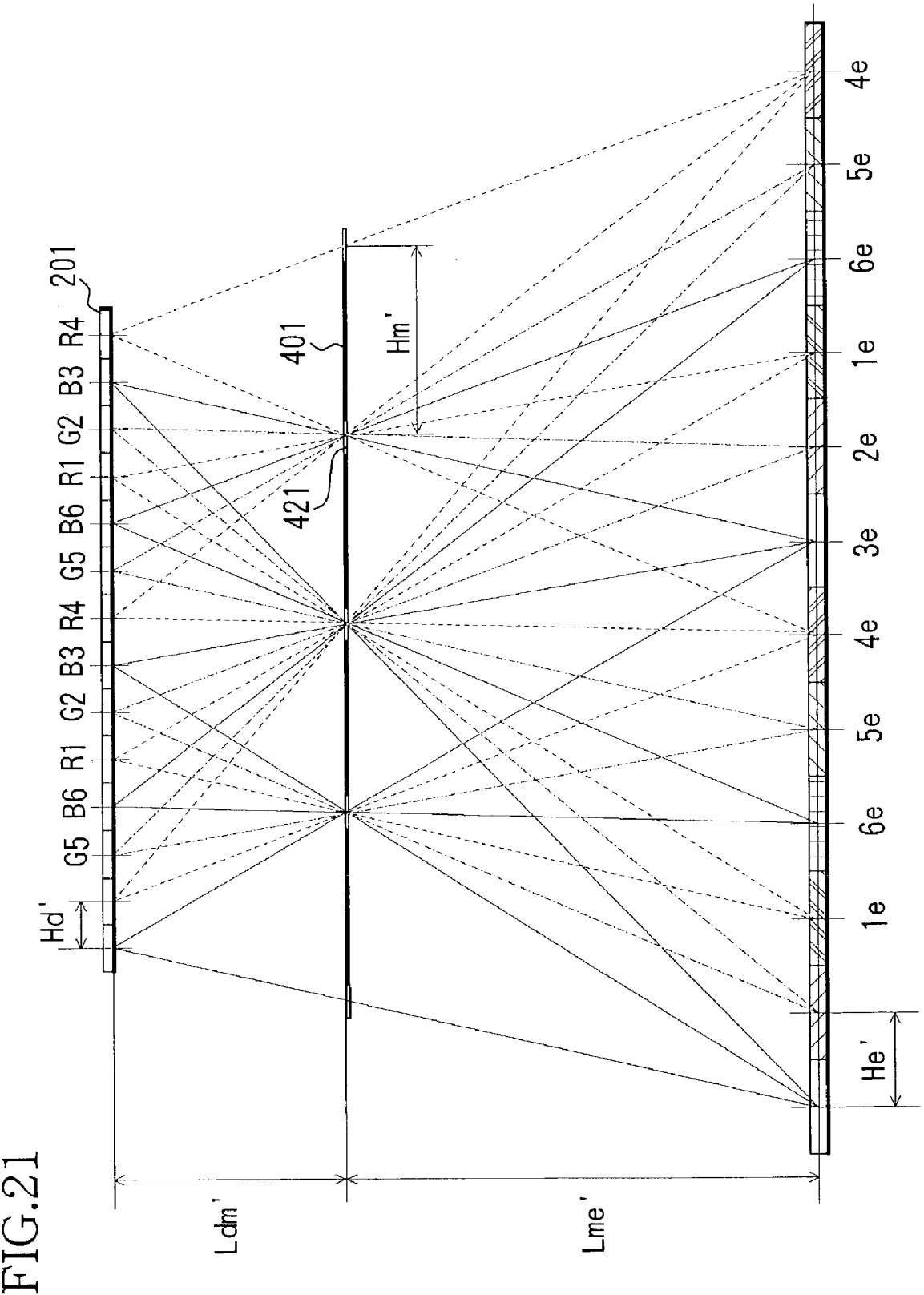
FIG. 21 is a horizontal section of the stereoscopic image display apparatus according to the Embodiment 2.

FIG. 21 is a horizontal section of the first row of the display unit 201 at T/6 seconds. Rays of light emerged from the subpixels R1 form the vertical strip-like viewpoints 1e with the width He' by passing through the aperture portions 421 of the mask 401.

In addition, rays of light from other subpixels G2, B3, R4, G5, and B6 form the vertical strip-like viewpoints 2e, 3e, 4e, 5e, and 6e with the width He' similarly. At this time, the viewpoints 1e and 4e are formed only by the rays of light of R, the viewpoints 2e and 5e are formed only by the rays of light of G, and the viewpoints 3e and 6e are formed only by the rays of light of B.

Figure 22:
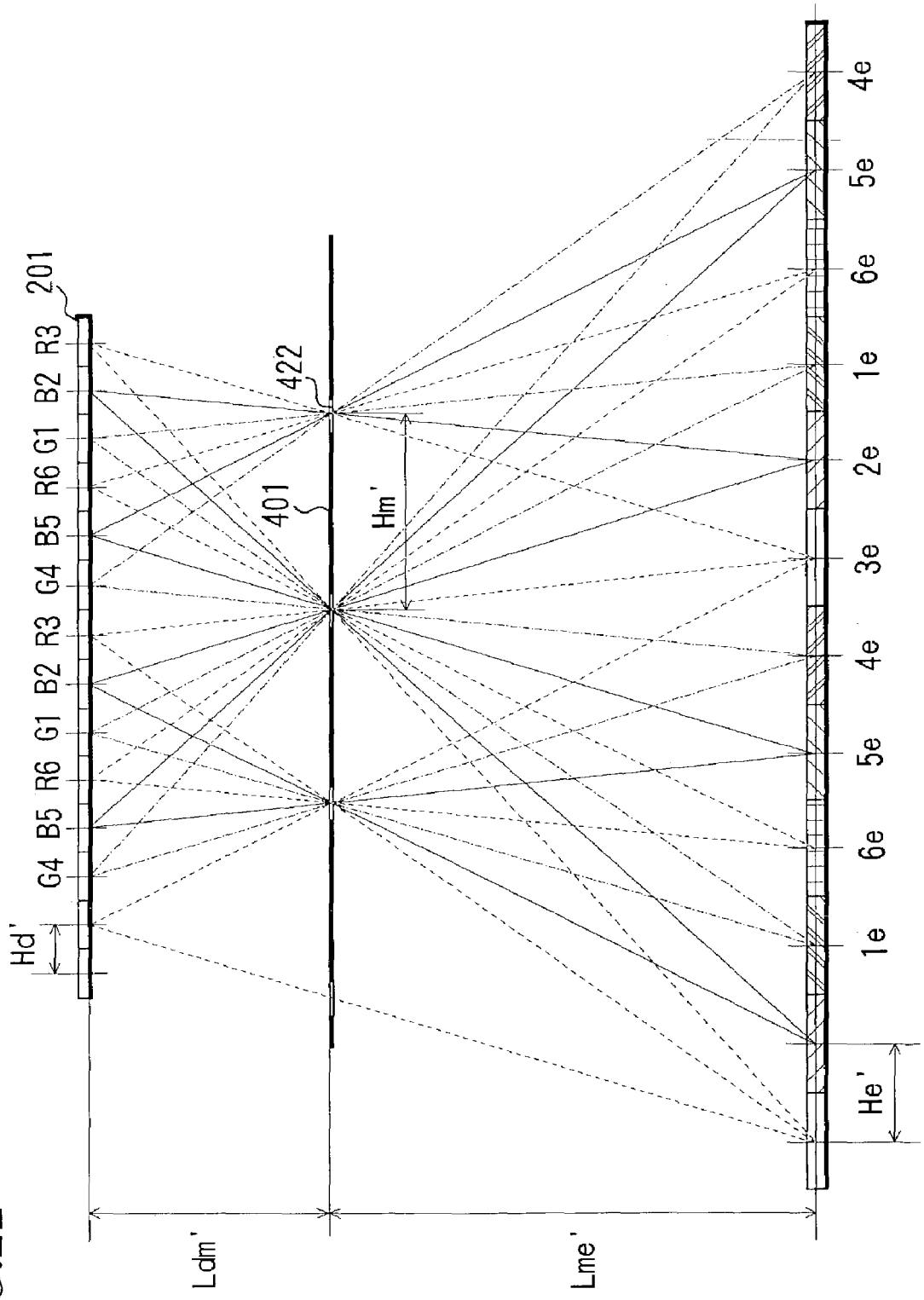
FIG. 22 is a horizontal section of the stereoscopic image display apparatus according to the Embodiment 2.

FIG. 22 is a horizontal section of the first row of the display unit 201 at 2T/6 seconds. Rays of light emerged from the subpixels G1, B2, R3, G4, B5, and R6 form the vertical strip-like viewpoints 1e, 2e, 3e, 4e, 5e, and 6e with the width He' by passing through the aperture portions 422 of the mask 401. At this time, the viewpoints 1e and 4e are formed only by the rays of light of G, the viewpoints 2e and 5e are formed only by the rays of light of B, and the viewpoints 3e and 6e are formed only by the rays of light of R.

Figure 23:
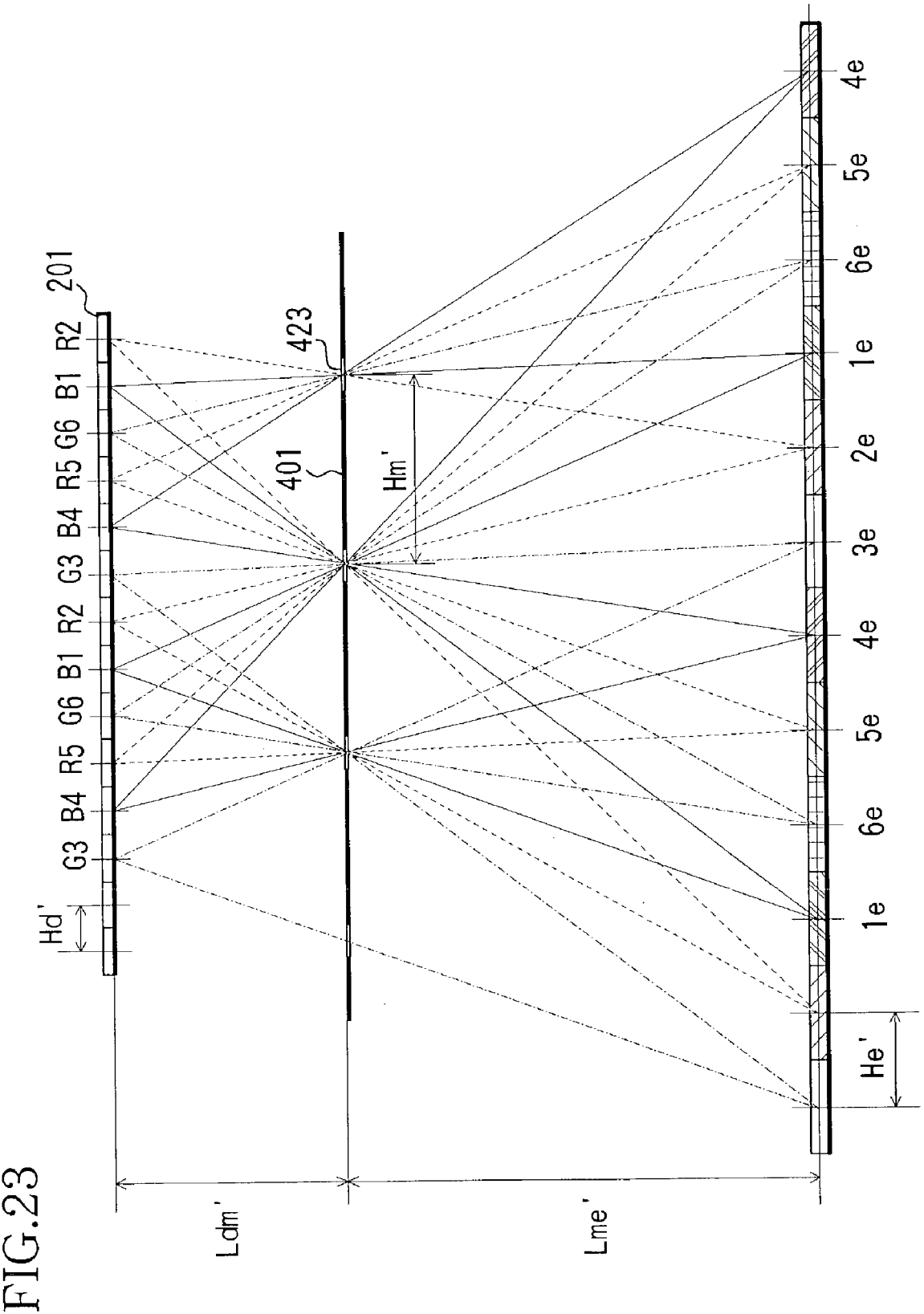
FIG. 23 is a horizontal section of the stereoscopic image display apparatus according to the Embodiment 2.

FIG. 23 is a horizontal section of the first row of the display unit 201 at 3T/6 seconds. Rays of light emerged from the subpixels B1, R2, G3, B4, R5, and G6 form the vertical strip-like viewpoints 1e, 2e, 3e, 4e, 5e, and 6e with the width He' by passing through the aperture portions 423 of the mask 401. At this time, the viewpoints 1e and 4e are formed only by the rays of light of B, the viewpoints 2e and 5e are formed only by the rays of light of R, and the viewpoints 3e and 6e are formed only by the rays of light of G.

Here, the rays of light of the subpixels R1, G1, and B1 reach the viewpoint 1e at T/6, 2T/6, and 3T/6 seconds, and if it is T=1/60 second or less, afterimages arise and three colors of rays of light are mixedly recognized. Hence, the above-mentioned color separation does not arise. Since similar relations stand up for the viewpoints 2e, 3e, 4e, 5e, and 6e, the color separation does not arise.

Hereafter, similarly, at 4T/6 seconds, rays of light emerged from the subpixels R1, G2, B3, R4, G5, and B6 form the vertical strip-like viewpoints 1e, 2e, 3e, 4e, 5e, and 6e with the width He' by passing through the aperture portions 421 of the mask 401. At this time, the viewpoints 1e and 4e are formed only by the rays of light of R, the viewpoints 2e and 5e are formed only by the rays of light of G, and the viewpoints 3e and 6e are formed only by the rays of light of B.

At 5T/6 seconds, rays of light emerged from the subpixels G1, B2, R3, G4, B5, and R6 form the vertical strip-like viewpoints 1e, 2e, 3e, 4e, 5e, and 6e with the width He' by passing through the aperture portions 422 of the mask 401. At this time, the viewpoints 1e and 4e are formed only by the rays of light of G, the viewpoints 2e and 5e are formed only by the rays of light of B, and the viewpoints 3e and 6e are formed only by the rays of light of R.

Furthermore, at 6T/6 seconds, rays of light emerged from the subpixels B1, R2, G3, B4, R5, and G6 form the vertical strip-like viewpoints 1e, 2e, 3e, 4e, 5e, and 6e with the width He' by passing through the aperture portions 423 of the mask 401. At this time, the viewpoints 1e and 4e are formed only by the rays of light of B, the viewpoints 2e and 5e are formed only by the rays of light of R, and the viewpoints 3e and 6e are formed only by the rays of light of G.

In this manner, since the rays of light of the subpixels with different colors reach at 3T/6, 4T/6, and 6T/6 seconds in the viewpoints "1e and 4e ", "2e and 5e ", and "3e and 6e ". Hence, if it is T=1/60 seconds or less, the rays of light of three colors are mixedly recognized by the afterimage effect, and hence, the color separation does not arise.

Therefore, when the combined parallax images and the mask aperture patterns are switched by a frequency of a multiple of three during a predetermined period (T) in the case of synchronously switching images shown in FIG. 19, that is, the combined parallax images, which are created by sequentially arranging strip-like viewpoint images, each of which is constituted by one subpixel group (column), horizontally so that mutually different viewpoint images may adjoin, and the mask aperture patterns, the color separation does not arise.

Figure 24:
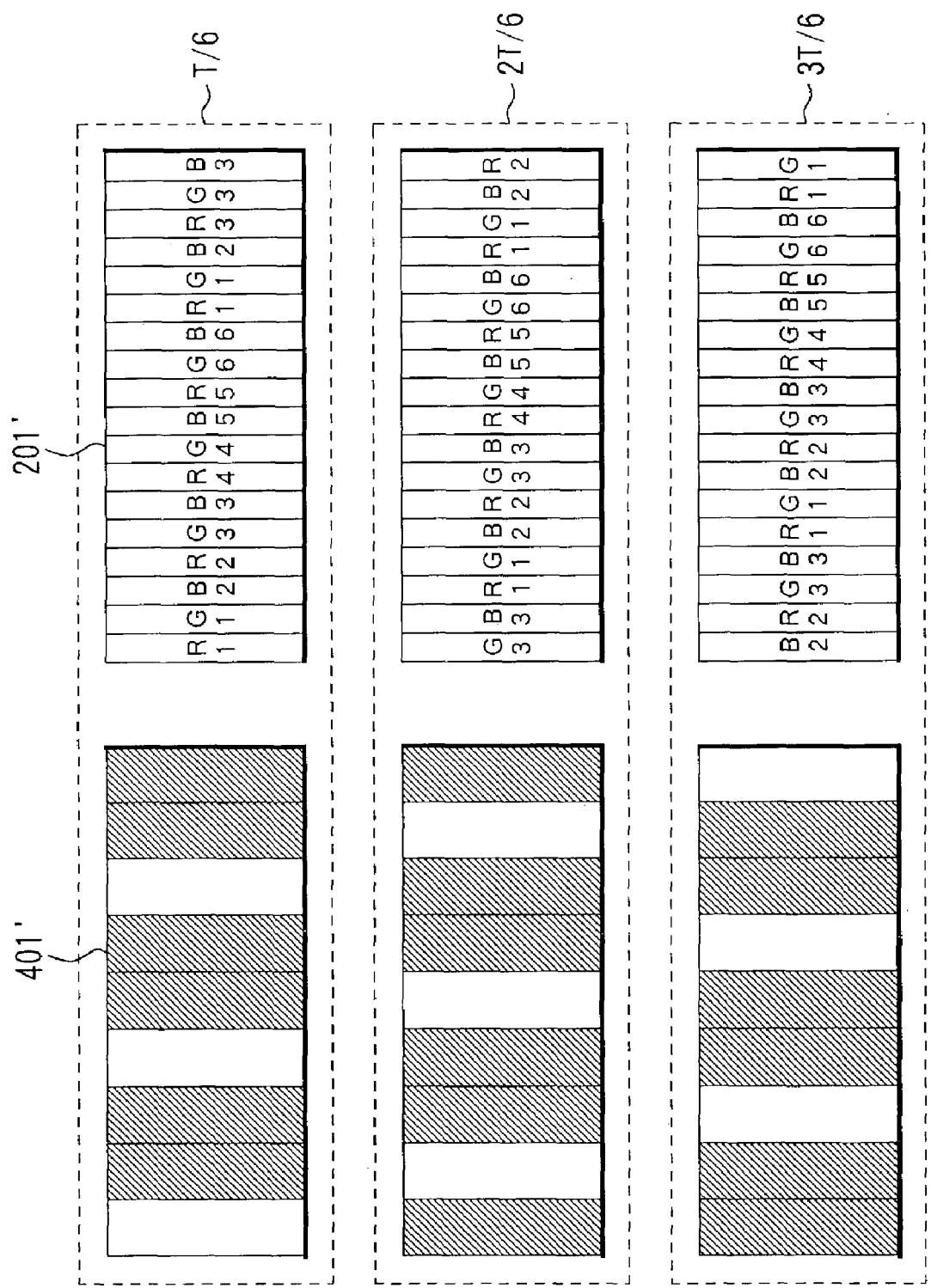
FIG. 24 is a drawing showing examples of combined parallax images and mask patterns in a stereoscopic image display apparatus that is a modified example of the Embodiment 2.

In addition, even if the strip-like viewpoint images by two subpixel groups (columns) shown in FIG. 24 are used, rays of light of three colors are mixedly recognized by the afterimage effect, and hence, the color separation does not arise.

In the drawing, the combined parallax images and the mask aperture patterns that are enclosed by dotted lines form pairs and are switched at intervals of T/6, 2T/6, and 3T/6 sequentially. Additionally, even if strip-like parallax images of four subpixels are used, the color separation does not arise.

Namely, only when viewpoint images by subpixel groups whose number is a multiple of three are used, the color separation arises.

In this manner, in this embodiment, the number of subpixels (in FIG. 19, for example, R1 or G2, and in FIG. 24, for example, R1 and G1, or B2 and R2), which constitute each of a plurality of combined parallax images and display viewpoint images corresponding to the same viewpoint among viewpoint images constituting the plurality of combined parallax images, becomes a number other than a multiple of n in the above-described horizontal subpixel line. Hence, rays of light of R, G, and B reach the same position (viewpoint) in the observation area sequentially and rays of light of three colors are mixedly recognized by the afterimage effect, and hence, the color separation does not arise. In particular, this is convenient in an application for obtaining a color stereoscopic image with high image quality by using the afterimage effect.

(Embodiment 3)

Figure 25:
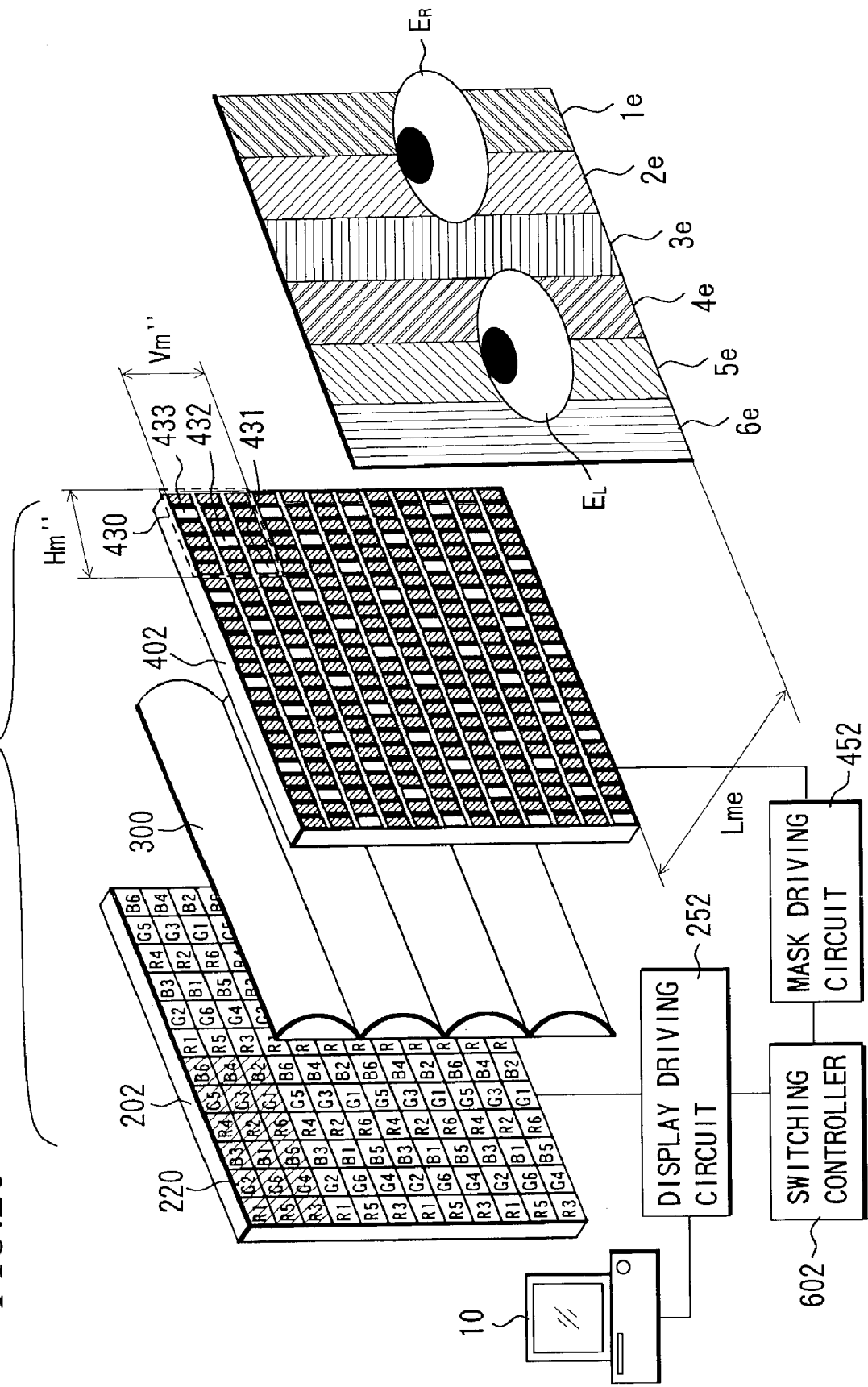
FIG. 25 is a perspective view showing the structure of a multiviewpoint type stereoscopic image display apparatus that is Embodiment 3 of the present invention.

FIG. 25 shows the structure of a multiviewpoint image display apparatus that is Embodiment 3 of the present invention. This embodiment aims to further eliminate the color separation by distributing subpixel groups, displaying one viewpoint color image, vertically and horizontally so as to obtain the afterimage effect effectively like Embodiment 1. In the drawing, members to which the same reference numerals and characters as those in Embodiment 1 are assigned have the same functions as those in Embodiment 1.

(Description of Stereoscopic Image Display Apparatus 102)

The stereoscopic image display apparatus 102 comprises a display unit 202, a lenticular lens 300, and a mask 402 as shown in FIG. 25.

(Display Unit 202)

The display unit 202 comprises a display device where pixels are arranged in the horizontal and vertical directions in a matrix like Embodiment 1, and is driven by a display driving circuit 252.

Figure 13:
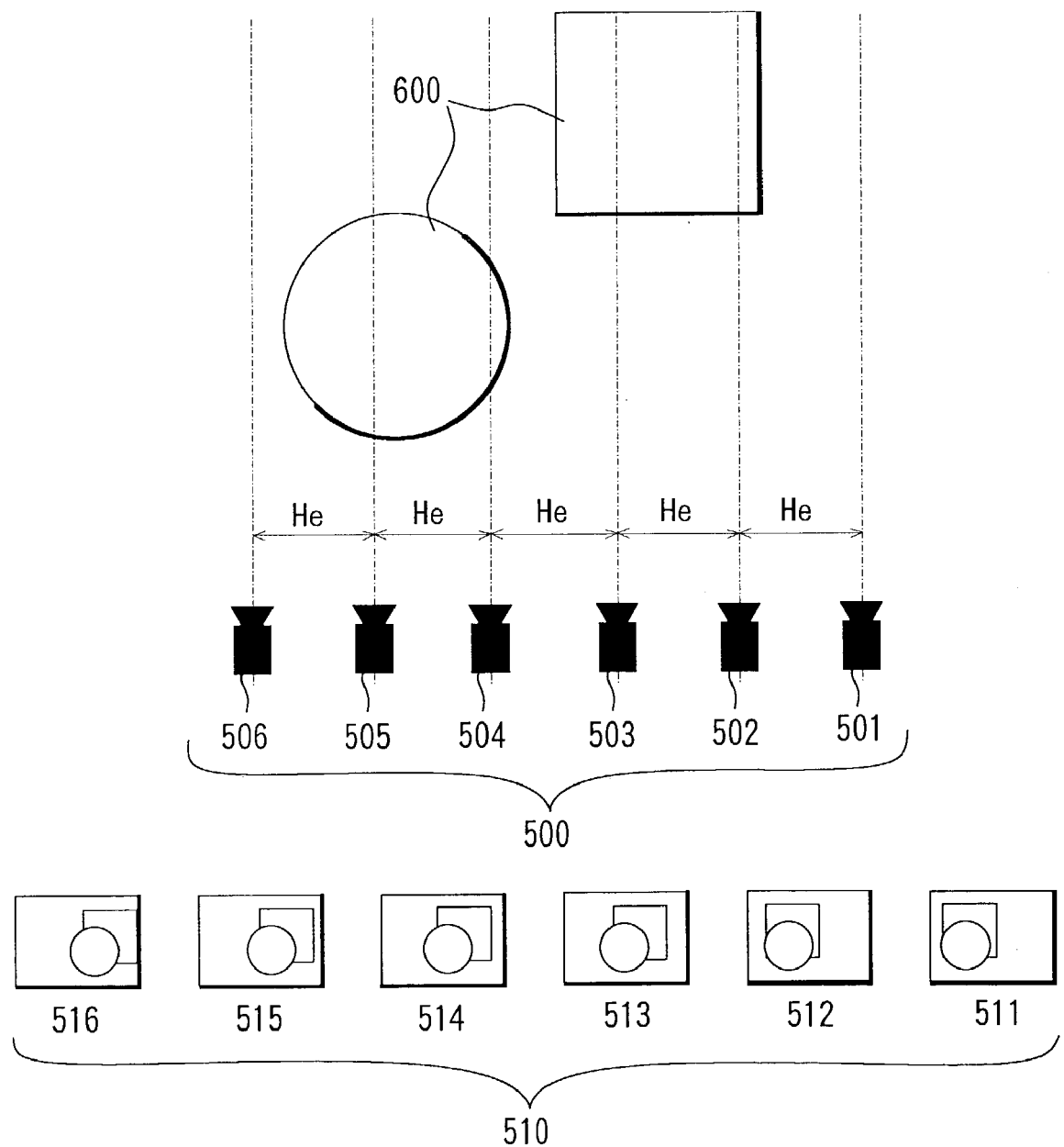
FIG. 13 is an explanatory diagram of a plurality of viewpoint images displayed in the stereoscopic image display apparatus according to the Embodiment 1.

The display unit 202 displays combined parallax images, each of which is formed by combining six viewpoint images as described in FIG. 13. Here, a subpixel block 220 is a block in which subpixels, displaying the substantially same portion in six viewpoint images formed in an observation area, are arranged in a matrix in predetermined order. And, a plurality of these subpixel blocks 220 is arranged in a matrix on the display unit 202.

A hatched area on the display unit 202 in FIG. 25 is one pixel block 220. In this embodiment, an example of the subpixel arrangement in the case of the number of viewpoint images being six is shown.

In FIG. 25, numbers of 1 to 6 shown in the subpixel block 220 show which viewpoint images observed in the observation area are displayed by the subpixels respectively.

One subpixel block 220 is constituted by arranging subpixels, which display the substantially same portions of the first to sixth viewpoint images respectively, in three rows× six columns. Three subpixels displaying the substantially same portions of the 1st, 5th, and 3rd viewpoint images are vertically arranged in the first column in this order, subpixels displaying the substantially same portions of the 2nd, 6th, and 4th viewpoint images are vertically arranged in the second column in this order, and subpixels displaying the substantially same portions of the 3rd, 1st, and 5th viewpoint images are vertically arranged in the third column in this order. Furthermore, subpixels displaying the substantially same portions of the 4th, 2nd, and 6th viewpoint images are vertically arranged in the fourth column, subpixels displaying the substantially same portions of the 5th, 3rd, and 1st viewpoint images are vertically arranged in the fifth column, and subpixels displaying the substantially same portions of the 6th, 4th, and 2nd viewpoint images are vertically arranged in the sixth column in this order.

Figure 26:
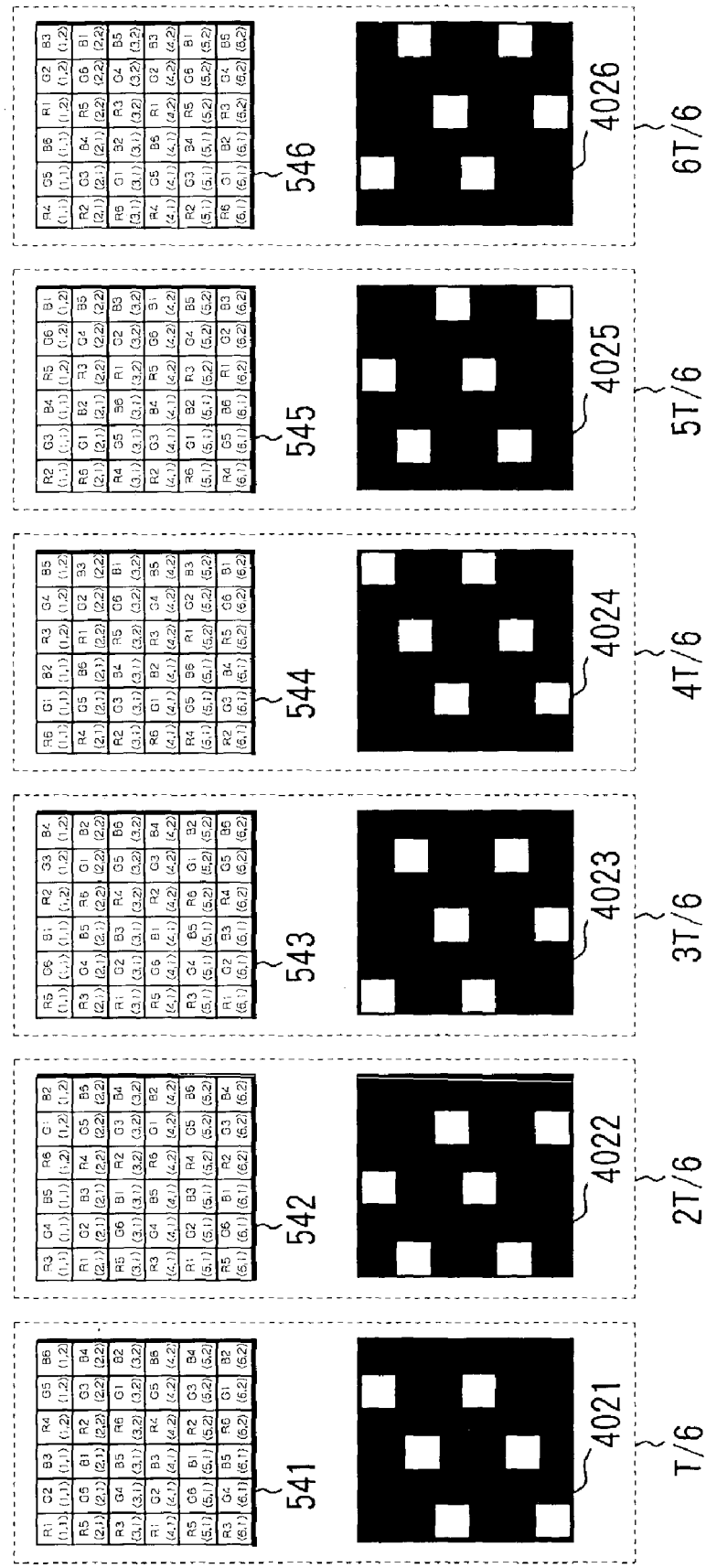
FIG. 26 is a drawing showing examples of combined parallax images and mask patterns in the stereoscopic image display apparatus according to the Embodiment 3.

Moreover, in this embodiment, six type of combined parallax images 541, 542, 543, 544, 545, and 546 shown in FIG. 26 are displayed with being switched by a switching controller 602 and display driving circuit 252 shown in FIG. 25. In the drawing, numerals without parentheses that are described in subpixels arranged in a matrix of 6 rows×6 columns denote the numbers of viewpoint images to be displayed, and numerals with parentheses denote positions (addresses) of the pixels in the matrix and denote color filters in which R, G, and B are located.

(Mask 402)

FIG. 26 shows the specific structure of the mask 402. The mask 402 comprises a liquid crystal panel in which rectangular unit areas are arranged in a matrix, and can form a mask having a desired mask aperture pattern by switching a transmissive state and a shading state in each unit area by electrical control performed by the switching controller 602 and a mask driving circuit 452 shown in FIG. 25. In this embodiment, six types of mask aperture patterns 4021, 4022, 4023, 4024, 4025, and 4026 shown in the drawing are switched.

In addition, the mask 402 is constituted by arranging a plurality of mask blocks 430, in which three aperture portions 431, 432, and 433 are formed, in a matrix, as shown in FIG. 25. Here, Vm" is the vertical height of the mask block 430, and Hm" is its horizontal width.

Moreover, three aperture portions 431, 432, and 433 in the mask block 430 are arranged so that their vertical positions may mutually adjoin and their horizontal positions may mutually differ.

Similarly to Embodiment 1, rays of light from each subpixel receive the lens action in the vertical direction by each cylindrical lens portion of the lenticular lens 300.

(Formation of Multiviewpoint Observation Area Columns)

In this embodiment, the combined parallax images and mask aperture patterns that are described in FIG. 26 are sequentially switched with synchronizing in pairs of 541 and 4021, 542 and 4022, 543 and 4023, 544 and 4024, 545 and 4025, and 546 and 4026 respectively. Positions of subpixel groups displaying respective viewpoint images in respective combined parallax images are as shown in FIG. 26. A period T when this switching goes around is 1/60 seconds.

Figure 27:
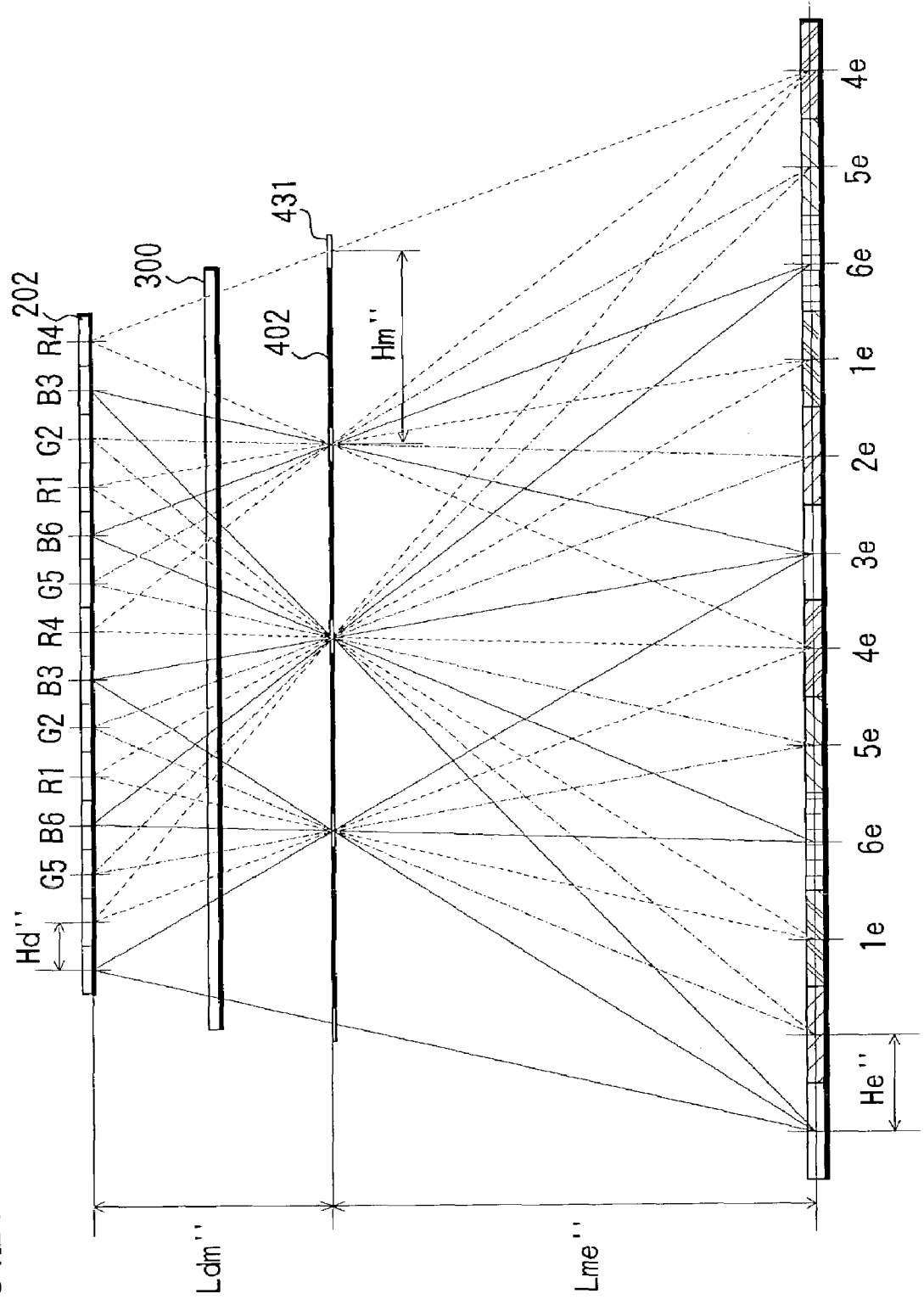
FIG. 27 is a horizontal section of the stereoscopic image display apparatus according to the Embodiment 3.
Figure 28:
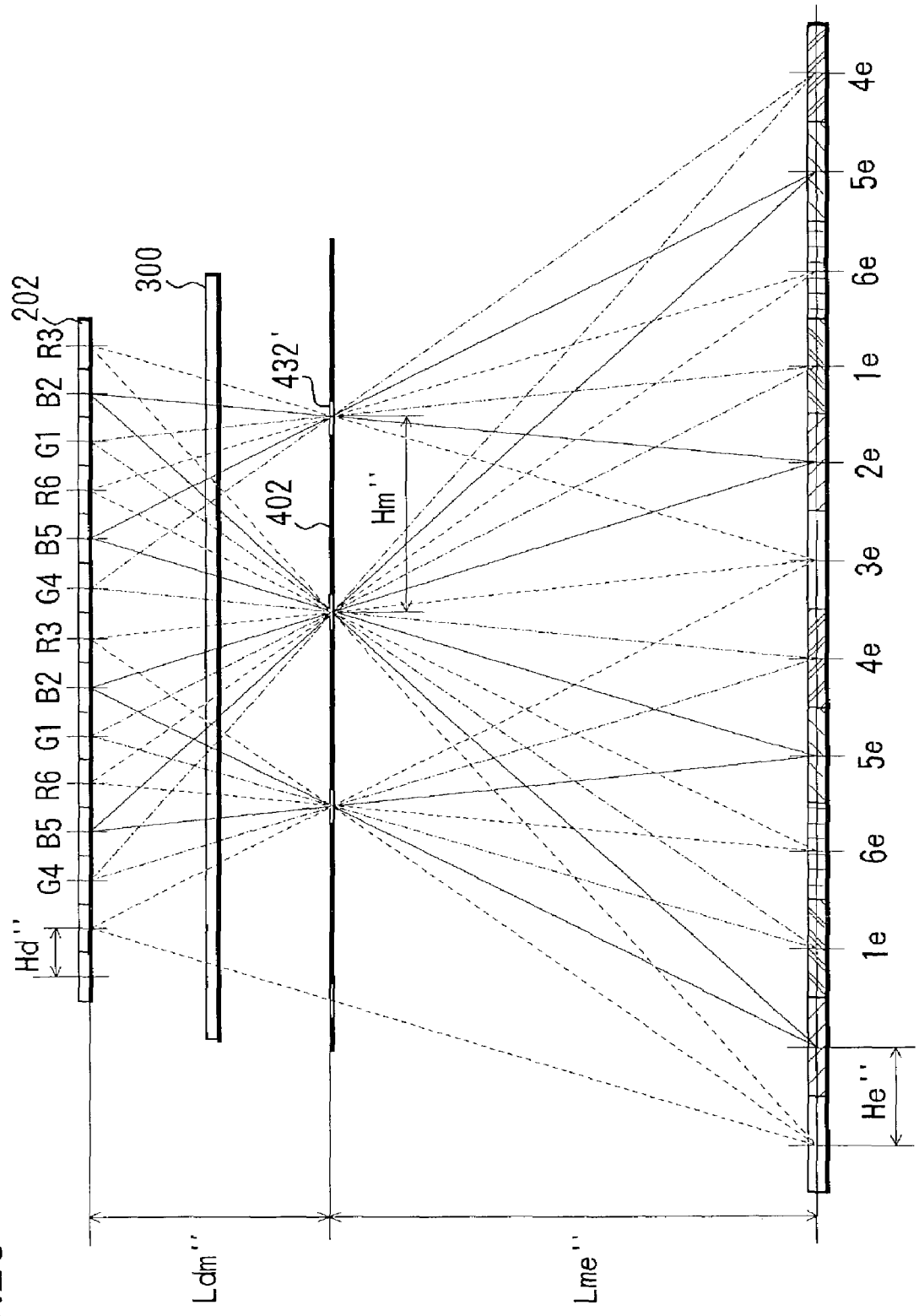
FIG. 28 is a horizontal section of the stereoscopic image display apparatus according to the Embodiment 3.
Figure 29:
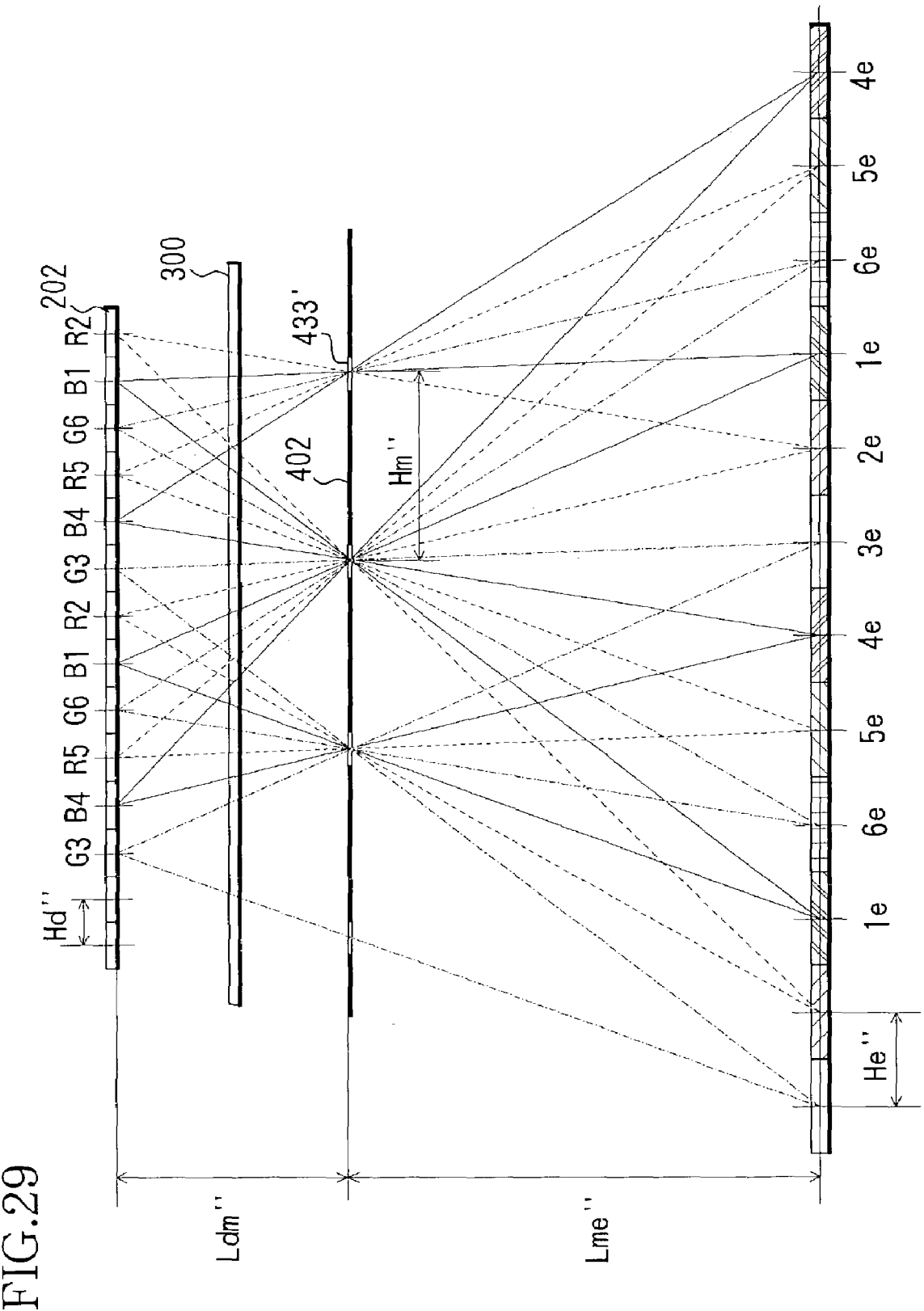
FIG. 29 is a horizontal section of the stereoscopic image display apparatus according to the Embodiment 3.

FIGS. 27 to 29 are drawings for showing positional relationship between contents displayed by the respective subpixels on the display unit 202 and aperture portions formed on the mask 402, and specifically, for showing positional relationship at different time at a horizontal cross-sectional surface passing through the first row of the display unit 202 and the third row of the mask 402. FIG. 27 shows the positional relationship at the first T/6 in the predetermined period T, FIG. 28 shows the positional relationship at the next T/6 (2T/6) and FIG. 29 shows the positional relationship at the further next T/6 (3T/6). The arrangement of the contents displayed by the respective subpixels on the display unit 202 and the positions of the aperture portions on the mask 402 in each figure is an example of this embodiment, it is possible to obtain the same effects by other arrangements.

In FIG. 27, aperture portions in the third row of the mask 402 are formed at the aperture portion 431 as shown in FIG. 25. Rays of light emerged from the subpixels R1 form the vertical strip-like viewpoints 1e with width He" by passing through the aperture portions 431 of the mask 402. In addition, rays of light from other subpixels G2, B3, R4, G5, and B6 form the vertical strip-like viewpoints 2e, 3e, 4e, 5e, and 6e with the width He" similarly. At this time, the viewpoints 1e and 4e are formed only by the rays of light of R, the viewpoints 2e and 5e are formed only by the rays of light of G, and the viewpoints 3e and 6e are formed only by the rays of light of B.

In FIG. 28, aperture portions in the third row of the mask 402 are formed at an aperture portion 432' which is just below the aperture portion 432 in FIG. 25. Rays of light emerged from the subpixels G1, B2, R3, G4, B5, and R6 form the vertical strip-like viewpoints 1e, 2e, 3e, 4e, 5e, and 6e with the width He" by passing through the aperture portions 432 of the mask 402. At this time, the viewpoints 1e and 4e are formed only by the rays of light of G, the viewpoints 2e and 5e are formed only by the rays of light of B, and the viewpoints 3e and 6e are formed only by the rays of light of R.

In FIG. 29, aperture portions in the third row of the mask 402 are formed at an aperture portion 433' which is just below the aperture portion 433 in FIG. 25. Rays of light emerged from the subpixels B1, R2, G3, B4, R5, and G6 form the vertical strip-like viewpoints 1e, 2e, 3e, 4e, 5e, and 6e with the width He" by passing through the aperture portions 433 of the mask 402. At this time, the viewpoints 1e and 4e are formed only by the rays of light of B, the viewpoints 2e and 5e are formed only by the rays of light of R, and the viewpoints 3e and 6e are formed only by the rays of light of G.

Hereafter, similarly, at 4T/6, rays of light emerged from the subpixels R1, G2, B3, R4, G5, and B6 form the vertical strip-like viewpoints 1e, 2e, 3e, 4e, 5e, and 6e with the width He" by passing through the aperture portions 431. At this time, the viewpoints 1e and 4e are formed only by the rays of light of R, the viewpoints 2e and 5e are formed only by the rays of light of G, and the viewpoints 3e and 6e are formed only by the rays of light of B.

At 5T/6, rays of light emerged from the subpixels G1, B2, R3, G4, B5, and R6 form the vertical strip-like viewpoints 1e, 2e, 3e, 4e, 5e, and 6e with the width He" by passing through the aperture portions 432'. At this time, the viewpoints 1e and 4e are formed only by the rays of light of G, the viewpoints 2e and 5e are formed only by the rays of light of B, and the viewpoints 3e and 6e are formed only by the rays of light of R.

Furthermore, at 6T/6, rays of light emerged from the subpixels B1, R2, G3, B4, R5, and G6 form the vertical strip-like viewpoints 1e, 2e, 3e, 4e, 5e, and 6e with the width He" by passing through the aperture portions 433'. At this time, the viewpoints 1e and 4e are formed only by the rays of light of B, the viewpoints 2e and 5e are formed only by the rays of light of R, and the viewpoints 3e and 6e are formed only by the rays of light of G.

In this manner, since the rays of light of the subpixels with different colors reach during T seconds in the viewpoints "1e and 4e ", "2e and 5e ", and "3e and 6e " respectively. Hence, if it is T=1/60 seconds or less, the rays of light of the respective colors are mixedly recognized by the afterimage effect. Therefore, the color separation does not arise in each viewpoint. In addition, subpixel groups displaying one viewpoint color image are dispersed vertically and horizontally so as to obtain the after image effect effectively. Hence, the combined parallax images that are displayed with being switched are recognized smoothly as one image, and image quality is good. In particular, this is convenient in an application for obtaining a stereoscopic image with high image quality by using the afterimage effect.

(Embodiment 4)

In Embodiment 4 of the present invention, by switching two types of images and two types of mask aperture patterns, not only resolution is doubled but also the number of displayed viewpoint images (namely, viewpoints) is doubled in comparison with the case without switching then.

Figure 30:
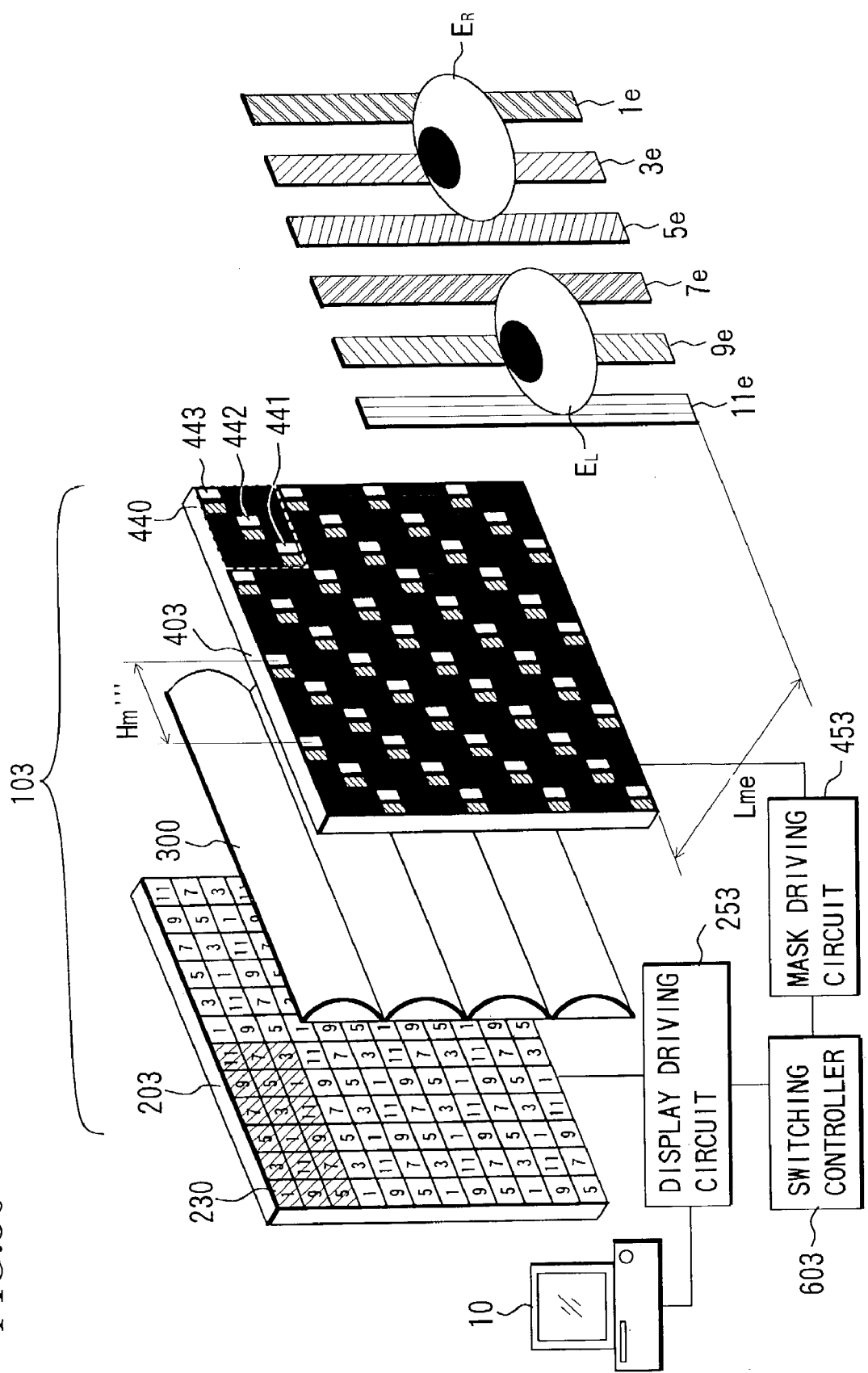
FIG. 30 is a perspective view showing the structure of a stereoscopic image display apparatus that is Embodiment 4 of the present invention.
Figure 31:
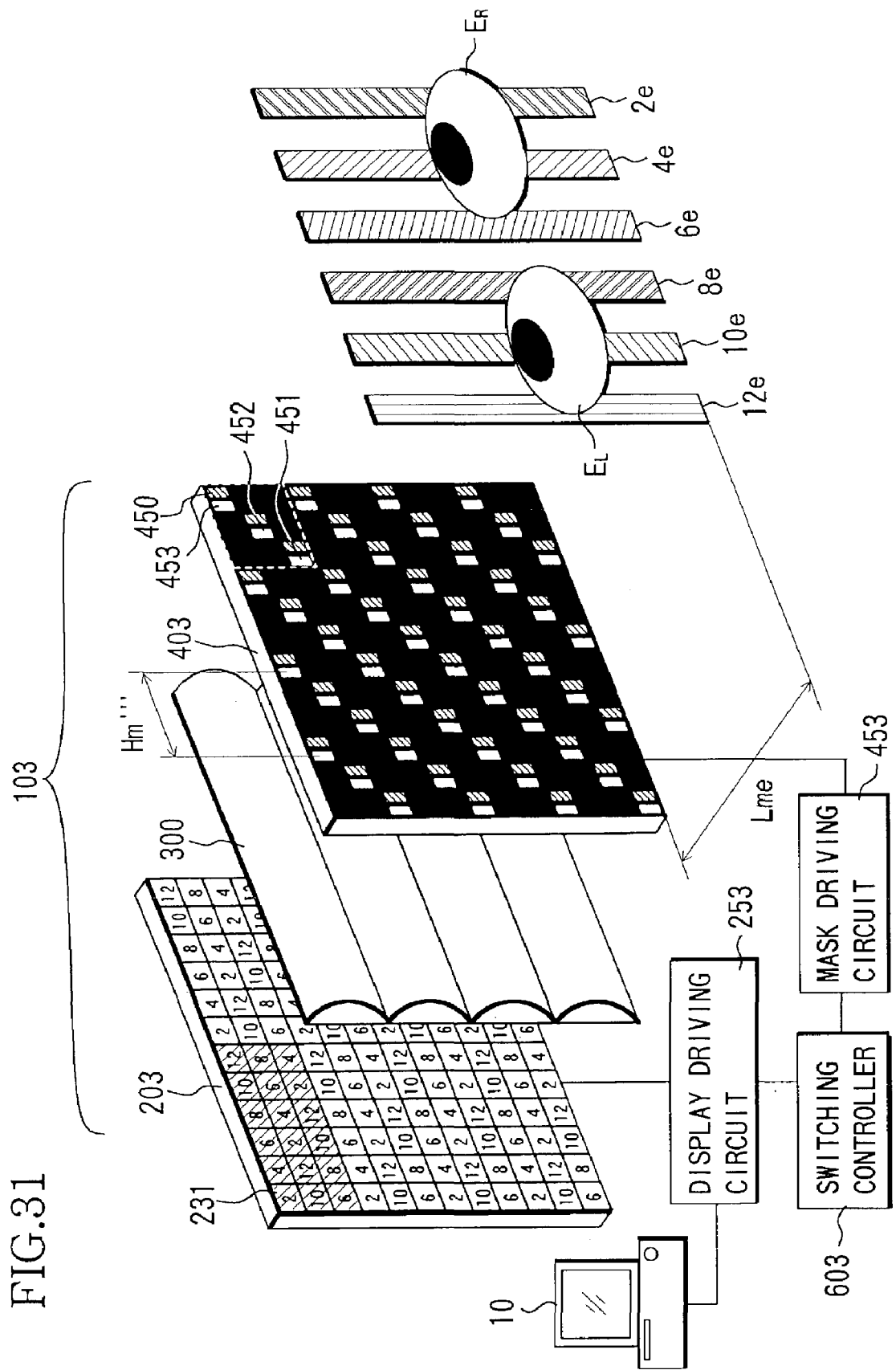
FIG. 31 is a perspective view showing the structure of the stereoscopic image display apparatus that is the Embodiment 4.

FIGS. 30 and 31 show the structure of a multiviewpoint image display apparatus that is Embodiment 4 of the present invention. In the drawing, members to which the same reference numerals and characters as those in Embodiment 1 are assigned have the same functions as those in Embodiment 1.

(Description of Stereoscopic Image Display Apparatus 103)

FIG. 30 describes the structure of using the first combined parallax image and the first mask aperture pattern, and FIG. 31 describes the structure of using the second combined parallax image and the second mask aperture pattern.

The stereoscopic image display apparatus 103 comprises a display unit 203, a lenticular lens 300, and a mask 403.

(Display Unit 203)

The display unit 203 comprises a display device in which pixels are arranged in the horizontal and vertical directions in a matrix similarly to that of Embodiment 1.

In FIG. 30, the first combined parallax image is displayed on the display unit 203. The first combined parallax image is created by the method similar to that described in Embodiment 1 from the 1st, 3rd, 5th, 7th, 9th, and 11th images among parallax images having been taken from twelve directions by a method equivalent to the method described in FIG. 13. Reference numeral 230 denotes a pixel block.

In FIG. 31, the second combined parallax image is displayed on the display unit 203. The second combined parallax image is created by the method similar to that described in Embodiment 1 from the 2nd, 4th, 6th, 8th, 10th, and 12th images among the above-described parallax images having been taken from twelve directions.

Namely, in this embodiment, a plurality of combined parallax images, whose viewpoints corresponding to a plurality of combined viewpoint images are mutually different, is displayed with being switched, by a switching controller 603 and a display driving circuit 253, on the display unit 203.

(Description of Mask 403)

The mask 403 comprises a liquid crystal panel and can form two types of mask aperture patterns by switching a transmissive state and a shading state in each unit area of a liquid crystal by electrical control performed by the switching controller 603 and a mask driving circuit 453.

In FIG. 30, the first mask aperture pattern is used, and this first mask aperture pattern is constituted by arranging a plurality of mask blocks 440, having three aperture portions 441, 442, and 443, in a matrix. The distance between adjacent aperture portions 441 is Hm''', and the distance between adjacent aperture portions is also Hm''' for aperture portions 442 and 443.

In FIG. 31, the second mask aperture pattern is used, and this second mask aperture pattern is constituted by arranging a plurality of mask blocks 450, having three aperture portions 451, 452, and 453, in a matrix. The distance between adjacent aperture portions 451 is Hm''', and the distance between adjacent aperture portions is also Hm''' for aperture portions 452 and 453.

In addition, the distance between the center of the aperture portion 441 (442) in the horizontal direction and the center of the aperture portion 451 (452) in the horizontal direction is Hmo'''.

(Formation of Multiviewpoint Observation Area Columns)

In the stereoscopic image display apparatus 103 with the above-described structure, each vertical strip-like viewpoint with width He'''/2 and each vertical strip-like dark portion with width He'''/2 are alternately formed at intervals of distance He'''/2 in an observation area.

Figure 32:
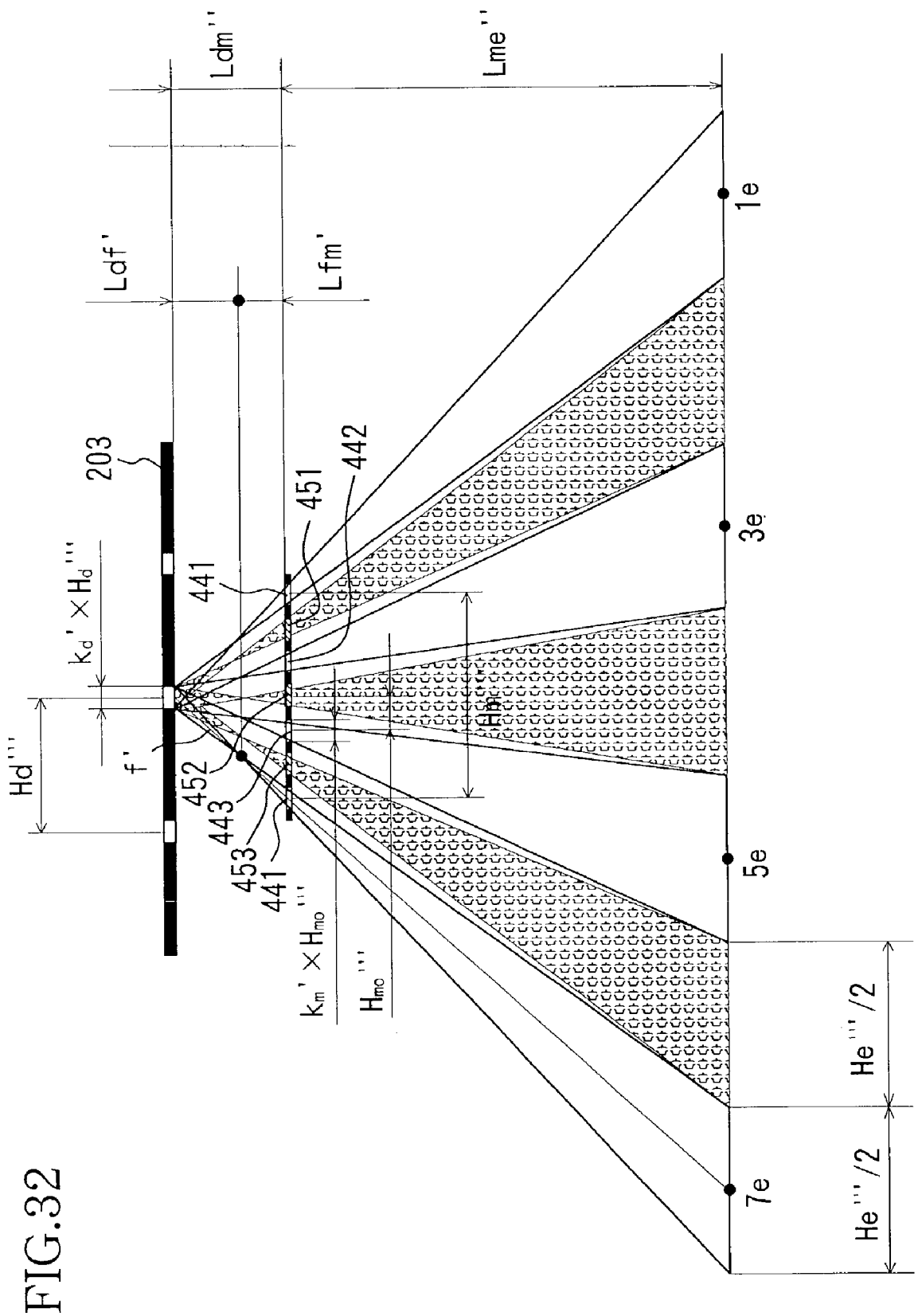
FIG. 32 is a horizontal section of the stereoscopic image display apparatus according to the Embodiment 4.
Figure 33:
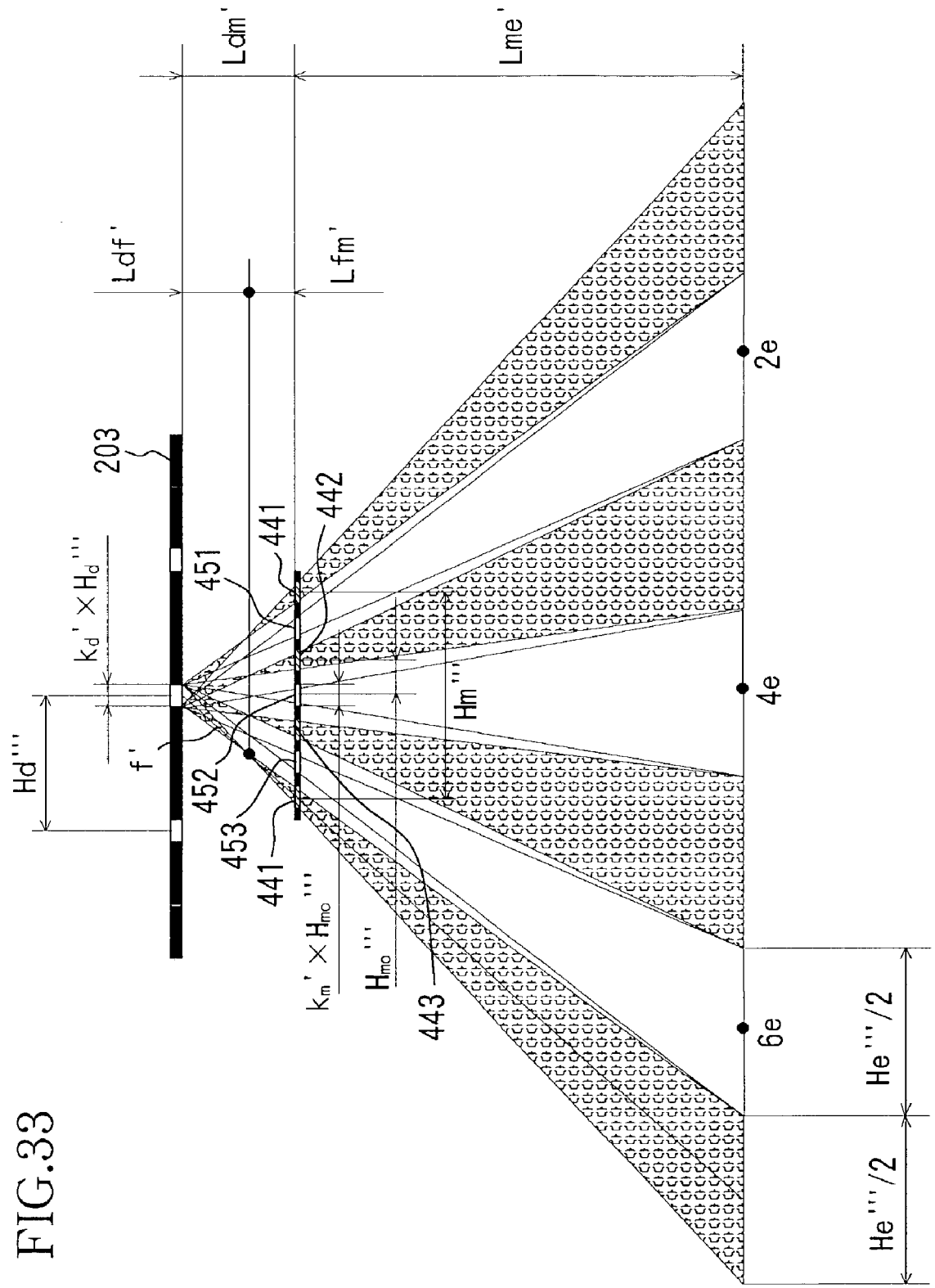
FIG. 33 is a horizontal section of the stereoscopic image display apparatus according to the Embodiment 4.

This alternate formation of each viewpoint and each dark portion where light from each pixel does not reach will be described. FIGS. 32 and 33 are sections taken on horizons passing through the first row of the display unit 203 and the third row of the mask 403 respectively (their sectional positions are different since there is an optical action of the lenticular lens 300).

FIG. 32 describes an aperture portion of a pixel of the display unit 203 and the aperture portion 441 of the mask 403 in the first mask aperture pattern in detail. In addition, positions of the aperture portions 442 and 443 that do not exist in the section shown in FIG. 32 are also shown. Furthermore, though the aperture portions 451 to 453 of the second mask aperture pattern do not exist in the section, their positions are shown as hatched areas.

FIG. 33 describes an aperture portion of a pixel of the display unit 203 and the aperture portion 451 of the mask 403 in the second mask pattern in detail. In addition, positions of the aperture portions 452 and 453 that do not exist in the section shown in FIG. 33 are also shown. Furthermore, though the aperture portions 441 to 443 of the first mask pattern do not exist in the section, their positions are shown as hatched areas.

Reference character kd' in the drawing denotes a horizontal aperture ratio in an aperture portion of a pixel of the display unit 203, and km' denotes a horizontal aperture rate in an aperture portion of the mask 403. Owing to this, the horizontal length of the aperture portion of the pixel on the display unit 203 is kd'×Hd', and the horizontal length of the aperture portion in the mask 403 is km'×Hmo'.

As shown in FIG. 32, a left edge portion of the aperture portion of the pixel on the display unit 203, a right edge portion of the aperture portion 441 in the mask 403, and a right edge portion of the viewpoint 1e with the width He'''/2 line up on a straight line. A right edge portion of the aperture portion of the pixel on the display unit 203, a left edge portion of the aperture portion 441 in the mask 403, and a left edge portion of the viewpoint 1e with the width He'''/2 line up on a straight line.

Similarly, as shown in FIG. 33, a left edge portion of the aperture portion of the pixel on the display unit 203, a right edge portion of the aperture portion 451 in the mask 403, and a right edge portion of the viewpoints 2e with the width He'''/2 line up on a straight line. A right edge portion of the aperture portion of the pixel on the display unit 203, a left edge portion of the aperture portion 451 in the mask 403, and a left edge portion of the viewpoint 2e with the width He'''/2 line up on a straight line.

When f' is an intersection of these straight lines, and Ldf' is the distance from the display unit 203 to the intersection f', and Lfm' is the distance from the intersection f' to the mask 403, the following relations stand up:

$$Ldm' = Ldf' + Lfm' \quad (12)$$

$$Kd' \times Hd''' : Ldf' = km' \times Hmo''' : Lfm' \quad (13)$$

$$Kd' \times Hd''' : Ldf = He'''/2 : Lme''' + Lfm' \quad (14)$$

Owing to these aperture limitations, in the stereoscopic image display apparatus 103, each vertical strip-like viewpoint with width He'''/2 and each vertical strip-like dark portion with width He'''/2 are alternately formed at intervals of the distance He'''/2 in the observation area.

Namely, viewpoints 1e, 3e, 5e, 7e, 9e, and 11e are formed in the state shown in FIG. 30, and viewpoints 2e, 4e, 6e, 8e, 10e, and 12e are formed in the state shown in FIG. 31.

In other words, a plurality of combined parallax images, whose viewpoints corresponding to a plurality of combined viewpoint images are mutually different, is displayed with being switched on the display unit 203. Spaces are left between viewpoints corresponding to a plurality of viewpoint images that constitutes each combined parallax image, and each viewpoint corresponding to viewpoint images that constitute one combined parallax image and each viewpoint corresponding to viewpoint images that constitute another combined parallax image are alternately arranged.

In addition, a light efficiency lowers owing to this. Nevertheless, though a general display unit diverges light also to an area that an observer cannot visually identify, the apparatus in this embodiment emerges light with aiming at observer's eyes, and hence, even if a light efficiency is low, a display image can be observed with sufficiently brightness.

When the state in FIG. 30 and the state in FIG. 31 are altenated every period T=1/60, afterimage effect of the combined parallax image in each state occurs in an observer, and hence, the viewpoints 1e to 12e will be distributed in the width He'''/2 as a whole.

In addition, since resolution for displaying one viewpoint image is 1/6 of the full pixel count of the display unit 203 at this time, it is possible to display an image in two-fold high resolution in comparison with the case without switching.

In addition, when a display unit with low resolution is combined with a mask constituted by a liquid crystal panel with high resolution as an application of this embodiment, it becomes possible to present an observer images substantially similar to the case of using a display unit with high resolution. Namely, by making two aperture portions, which become a pair on the mask, correspond to the same pixel on the display unit, and switching images displayed by the pixel with synchronizing with switching the positions of the aperture portions on the mask, the pixel can function similar to the case with two pixels. In addition, by increasing the number of aperture portions on a mask, corresponding to one pixel on a display unit, switching aperture portions in time-sharing, and switching images displayed by the pixel concerned is switched with synchronizing with the aperture portion switching, it is possible to increase the resolution of the display unit in correspondence to the number of the aperture portions.

(Modified Example of Embodiment 4)

Figure 34:
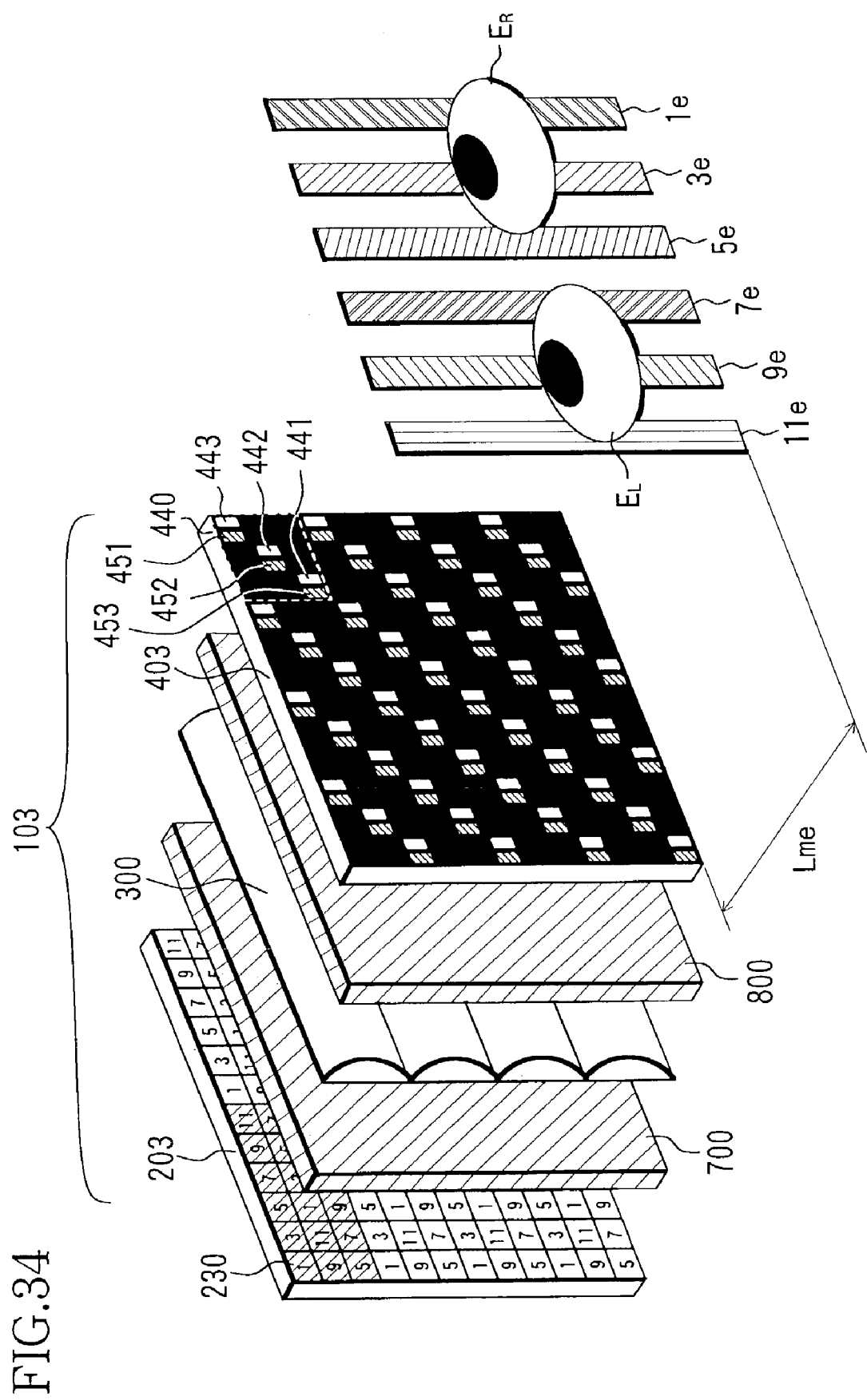
FIG. 34 is a perspective view showing the structure of a stereoscopic image display apparatus that is a modified example of the Embodiment 4.

Though the mask 403 comprises a liquid crystal panel in the above-described Embodiment 4, as shown in FIG. 34, it is also good to provide a deflector plate with a deflection axis of 45° in an area of the aperture portions 441, 442, and 443, and a deflector plate with a deflection axis of 135° in an area of the aperture portions 451, 452, and 453, and furthermore, to provide a deflector plate 700 with a deflection axis of 45° in the observation area side of the display unit 203, and an optical member 800, which can switch a deflection phase by zero or π, in the display unit side of the mask 403.

When a deflection axis of the light passing through the optical member 800 is 45°, the light transmits the aperture portions 441, 442, and 443, but light toward the aperture portions 451, 452, and 453 is shaded. When a deflection axis of the light passing through the optical member 800 is 135°, the light transmits the aperture portions 451, 452, and 453, but light toward the aperture portions 441, 442, and 443 is shaded.

In addition, it is also acceptable to switch a position of an aperture portion with mechanically moving the mask 403.

(Another Modified Example of Embodiment 4)

Moreover, it is possible to use in the above-described Embodiment 4 such a stripe-like combined parallax image that is described in Embodiment 2.

Figure 35:
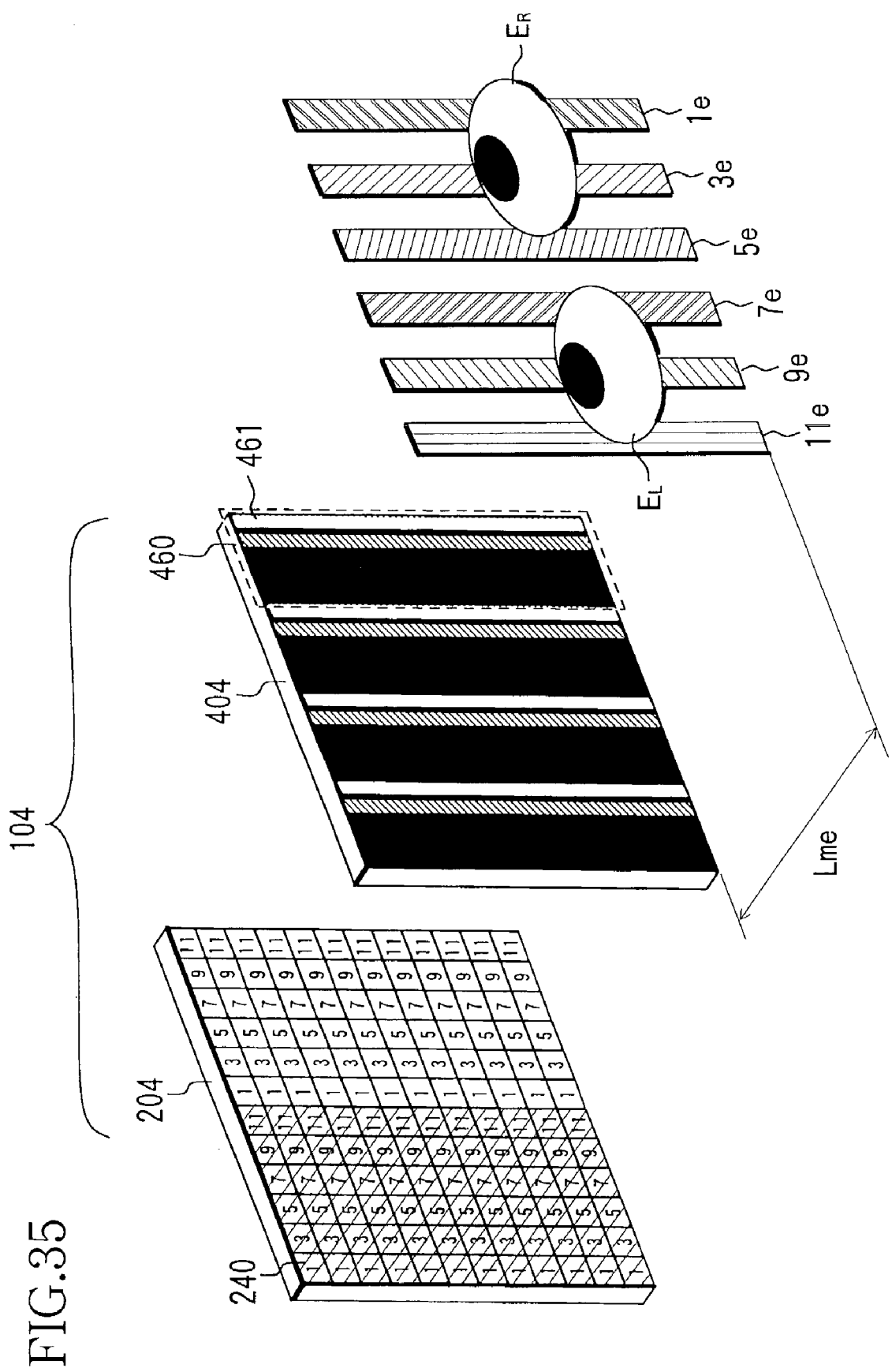
FIG. 35 is a perspective view showing a stereoscopic image display apparatus that is another modified example of the Embodiment 4.
Figure 36:
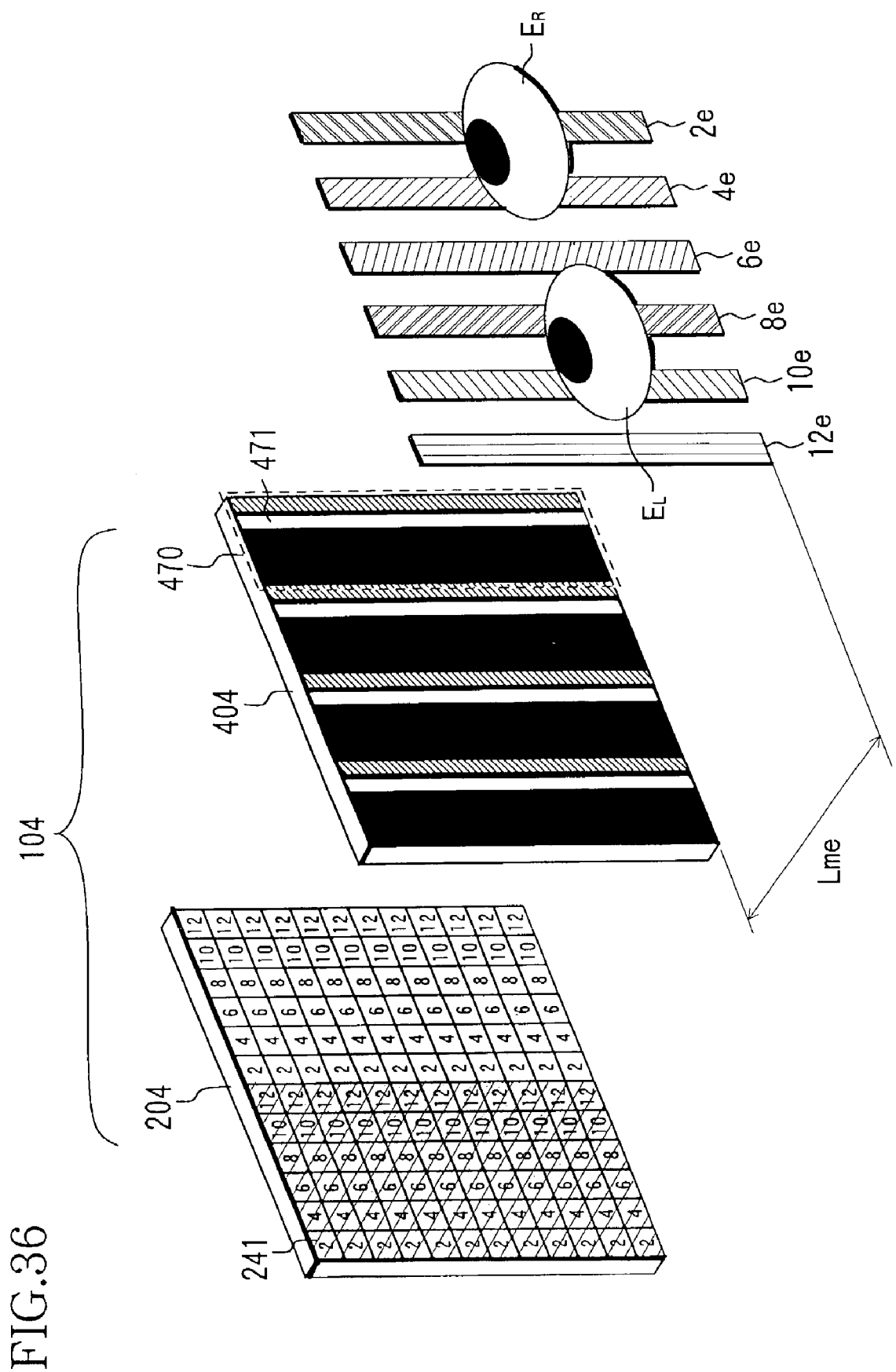
FIG. 36 is a perspective view showing a stereoscopic image display apparatus that is still another modified example of the Embodiment 4.
Figure 37:
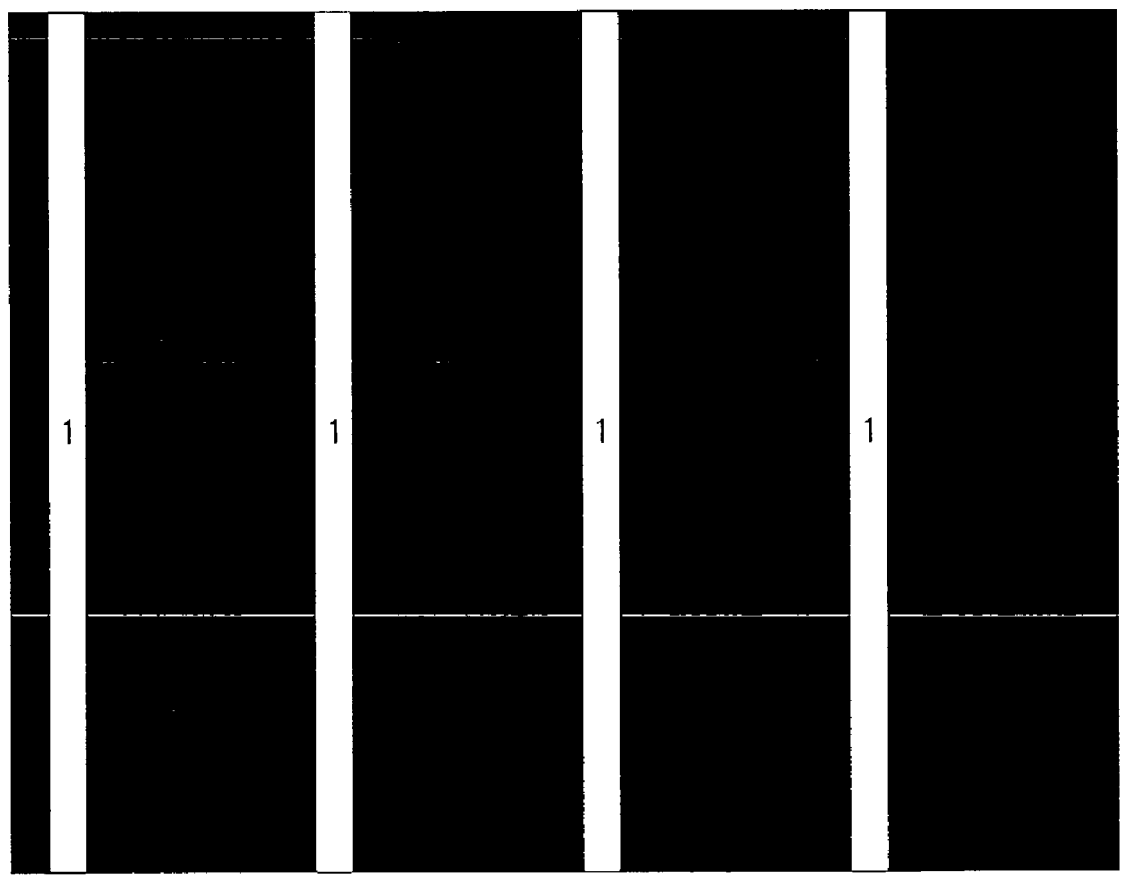
FIG. 37 is a front view showing a mask aperture pattern in a conventional stereoscopic image display apparatus.

FIGS. 35 and 36 show such a stereoscopic image display apparatus 104. Specifically, this apparatus switches a pixel pattern (arrangement pattern of a plurality of pixel groups) 240 and a pixel pattern 241 on the display unit 204, and also switches a mask aperture pattern 460 and a mask aperture pattern 470 on the mask 404 with synchronizing with the pixel pattern switching.

In FIG. 35, rays of light from pixels 1, 3, 5, 7, 9, and 11 pass through an aperture portion 461 of the mask 404 to form viewpoints 1e, 3e, 5e, 7e, 9e, and 11e. In addition, in FIG. 36, rays of light from pixels 2, 4, 6, 8, 10, and 12 pass through an aperture portion 471 of the mask 404 to form viewpoints 2e, 4e, 6e, 8e, 10e, and 12e. Then, by alternately switching these states at such speed that the afterimage effect of display images occurs, it is possible to form the vertical strip-like viewpoints 1e to 12e in the observation area as a whole.

In this manner, in Embodiment 4, by switching two types of combined parallax images and two types of mask aperture patterns, it is possible to double resolution, and further, to double the number of displayed viewpoint images (number of viewpoints) in comparison with the case without switching. In particular, this embodiment is also convenient in an application for obtaining a stereoscopic image with high image quality by using the afterimage effect.

In addition, though two types of combined parallax images and two types of mask aperture patterns are switched in this embodiment, it is also acceptable to switch combined parallax images and mask aperture patterns that are other number of types than these. In this case, it is good to leave spaces between viewpoints corresponding to a plurality of viewpoint images constituting each combined parallax image, and to arrange the viewpoints so that the viewpoints corresponding to the viewpoint images constituting each combined parallax image may be repeated in predetermined order.

In addition, though the case of using an image display unit in which pixels are arranged in a matrix is described in each embodiment that is above described, the present invention can be also applied in the case of using an image display unit in which pixels are arranged in a so-called delta-shape.

As described above, according to the present invention, since it is possible to disperse pixels (pixel group) for displaying each viewpoint image horizontally and vertically without a bias on an image display unit, it is possible to improve the balance of resolution of each viewpoint image in the horizontal and vertical directions. Therefore, it is possible to display a stereoscopic image with high resolution when displaying the stereoscopic image by the afterimage effect by displaying a plurality of images (combined parallax images) with switching them.

In addition, according to the present invention, it is possible to make rays of light from n colors of subpixels reach each viewpoint sequentially, and to make an observer recognize an image as if n colors of light were mixed by the afterimage effect, that is, without making the observer feel the color separation.

Moreover, the present invention can increase the number of viewpoint images (namely, the number of viewpoints) that can be displayed without reducing the number of pixels to display each viewpoint image in comparison with the conventional.

While preferred embodiments have been described, it is to be understood that modification and variation of the present invention may be made without departing from the sprit or scope of the following claims.

What is claimed is:

1. A stereoscopic image display apparatus, comprising:
   an image display unit which displays a combined image formed by combining a first, second and third viewpoint images corresponding to a first, second and third viewpoints different from one another in the horizontal direction, and includes a first pixel group displaying the first viewpoint image, a second pixel group displaying the second viewpoint image and a third pixel group displaying the third viewpoint image;
   a mask member which has a plurality of aperture portions guiding each light from the first, second and third pixel groups to the first, second and third viewpoints, respectively;
   a lenticular lens array which is arranged between the image display unit and the mask member and has a plurality of lenses with only refractive power in the vertical direction; and
   a switching control circuit that makes the image display unit display the plurality of combined images, in which arrangement of the first, second and third pixel groups are mutually different, and that switches arrangement of the aperture portions in the mask member with synchronizing with the switching of these combined images,
   wherein each pixel adjacent to each pixel of the first pixel group in the horizontal and vertical directions is not the pixel included in the first pixel group,
   each pixel adjacent to each pixel of the second pixel group in the horizontal and vertical directions is not the pixel included in the second pixel group,
   each pixel adjacent to each pixel of the third pixel group in the horizontal and vertical directions is not the pixel included in the third pixel group,
   the image display unit has a fourth, fifth and sixth image pixel groups different from the first, second and third pixel groups, the fourth, fifth and sixth image pixel groups corresponding to a fourth, fifth and sixth viewpoints different from the first, second and third viewpoints,
   the patterns of arrangement of the aperture portions are six, and
   the aperture portions of the mask member are formed by repeating the pattern of the arrangement of three aperture portions in a predetermined area in the horizontal and vertical directions.

2. The stereoscopic image display apparatus according to claim 1, wherein an optical member arranged between the image display unit and the mask member is only the lenticular lens array.

* * * * *